(12) United States Patent
Sato

(10) Patent No.: US 10,425,985 B2
(45) Date of Patent: Sep. 24, 2019

(54) WIRELESS COMMUNICATION APPARATUS, INFORMATION PROCESSING APPARATUS, COMMUNICATION SYSTEM, AND CONTROL METHOD FOR WIRELESS COMMUNICATION APPARATUS

(75) Inventor: Masanori Sato, Tokyo (JP)

(73) Assignee: Sony Corporation, Tokyo (JP)

(*) Notice: Subject to any disclaimer, the term of this patent is extended or adjusted under 35 U.S.C. 154(b) by 71 days.

(21) Appl. No.: 14/124,833

(22) PCT Filed: Jun. 8, 2012

(86) PCT No.: PCT/JP2012/003748
§ 371 (c)(1),
(2), (4) Date: Dec. 9, 2013

(87) PCT Pub. No.: WO2012/172763
PCT Pub. Date: Dec. 20, 2012

(65) Prior Publication Data
US 2014/0120878 A1    May 1, 2014

(30) Foreign Application Priority Data
Jun. 17, 2011 (JP) ................................. 2011-134683

(51) Int. Cl.
*H04M 1/66* (2006.01)
*H04W 76/40* (2018.01)
(Continued)

(52) U.S. Cl.
CPC ........... *H04W 76/40* (2018.02); *H04L 63/104* (2013.01); *H04M 1/7253* (2013.01);
(Continued)

(58) Field of Classification Search
CPC ..... H04W 76/40; H04W 12/04; H04W 48/02; H04W 12/08; H04W 4/70; H04W 12/06;
(Continued)

(56) References Cited

U.S. PATENT DOCUMENTS 6,873,824 B2 * 3/2005 Flick ............................ 455/41.2
7,689,875 B2 * 3/2010 Cahill ................. G06F 11/0757
714/23
(Continued)

FOREIGN PATENT DOCUMENTS

CN      103404186 A     11/2013
EP       2661110 A1     11/2013
(Continued)

OTHER PUBLICATIONS

3GPP TR 33.812 V9.2.0 (Jun. 2010) Technical Report. 3rd Generation Partnership Project; Technical Specification Group Services and System Aspects; Feasibility study on the security aspects of remote provisioning and change of subscription for Machine to Machine (M2M) equipment (Release 9). Jun. 2010.
(Continued)

*Primary Examiner* — Mahendra R Patel
(74) *Attorney, Agent, or Firm* — Chip Law Group

(57) ABSTRACT

An information processing apparatus and method provide logic for provisionally transferring shared connection rights to one or communications devices. In one implementation, a information processing apparatus includes a receiving unit configured to receive, from a first communications device, a request to join a group of second communications devices associated with at least one shared connection right A control unit of the information processing apparatus may be configured to provisionally transfer the shared connection right to the first communications device, in response to the received request.

20 Claims, 24 Drawing Sheets

(51) Int. Cl.
*H04L 29/06* (2006.01)
*H04M 1/725* (2006.01)
*H04W 12/08* (2009.01)
*H04W 48/02* (2009.01)
*H04W 12/04* (2009.01)
*H04W 12/00* (2009.01)
*H04M 3/38* (2006.01)
*H04W 12/06* (2009.01)
*H04W 4/70* (2018.01)

(52) U.S. Cl.
CPC ....... *H04W 12/0023* (2019.01); *H04W 12/04* (2013.01); *H04W 12/08* (2013.01); *H04W 48/02* (2013.01); *H04M 3/38* (2013.01); *H04M 2203/2044* (2013.01); *H04W 4/70* (2018.02); *H04W 12/06* (2013.01)

(58) Field of Classification Search
CPC ............... H04W 76/00; H04M 1/7253; H04M 2203/2044; H04M 3/38; H04L 63/104
USPC ...... 455/519, 466, 518, 92, 411, 414.1, 558, 455/406; 707/750
See application file for complete search history.

(56) References Cited

U.S. PATENT DOCUMENTS

| | | | |
|---|---|---|---|
| 8,712,474 B2 * | 4/2014 | Gehrmann | H04W 8/205 455/411 |
| 2003/0204734 A1 * | 10/2003 | Wheeler | H04L 9/0844 713/184 |
| 2003/0233364 A1 * | 12/2003 | Nakao | G06Q 10/101 |
| 2004/0176075 A1 * | 9/2004 | Schwarz | H04W 28/26 455/414.1 |
| 2007/0004457 A1 * | 1/2007 | Han | H04W 8/20 455/558 |
| 2007/0160192 A1 * | 7/2007 | Horio | H04M 3/56 379/338 |
| 2007/0223398 A1 * | 9/2007 | Luo | H04W 4/08 370/254 |
| 2007/0258440 A1 * | 11/2007 | Watanabe | H04L 41/0893 370/352 |
| 2008/0096524 A1 * | 4/2008 | True | H04L 12/1457 455/406 |
| 2008/0256182 A1 * | 10/2008 | Sekaran | G06Q 10/10 709/204 |
| 2008/0261561 A1 * | 10/2008 | Gehrmann | H04W 8/205 455/411 |
| 2008/0293414 A1 * | 11/2008 | Lin | H04M 1/72519 455/435.2 |
| 2008/0320153 A1 * | 12/2008 | Douville | H04L 45/02 709/229 |
| 2009/0191857 A1 * | 7/2009 | Horn | H04W 4/70 455/419 |
| 2010/0095009 A1 * | 4/2010 | Matuszewski | H04L 67/104 709/228 |
| 2010/0100603 A1 * | 4/2010 | Alston | H04N 7/147 709/207 |
| 2010/0261488 A1 * | 10/2010 | Little | H04L 12/1886 455/466 |
| 2011/0055227 A1 * | 3/2011 | Igarashi | H04W 4/70 707/750 |
| 2012/0149328 A1 * | 6/2012 | Chakraborty | H04M 3/42238 455/411 |
| 2014/0038658 A1 | 2/2014 | Masanori et al. | |

FOREIGN PATENT DOCUMENTS

| | | | | |
|---|---|---|---|---|
| JP | 2002-252723 | A | 9/2002 | |
| JP | 2004-013341 | A | 1/2004 | |
| JP | 2005-311765 | A | 11/2005 | |
| JP | 2006-164234 | A | 6/2006 | |
| JP | 2006-222876 | A | 8/2006 | |
| JP | 2010-244554 | A | 10/2010 | |
| WO | WO-2009095295 | A1 * | 8/2009 | ............. H04W 4/70 |
| WO | WO-2010124476 | A1 * | 11/2010 | ........ H04L 63/0869 |

OTHER PUBLICATIONS

Office Action Received for Chinese Patent Application No. 201280028600.8, dated Mar. 15, 2016, 31 pages of office action including 18 pages of English translation.

Office Action for EP Patent Application No. 12801367.9, dated Feb. 1, 2017, 05 pages of Office Action.

* cited by examiner

[Fig. 1]
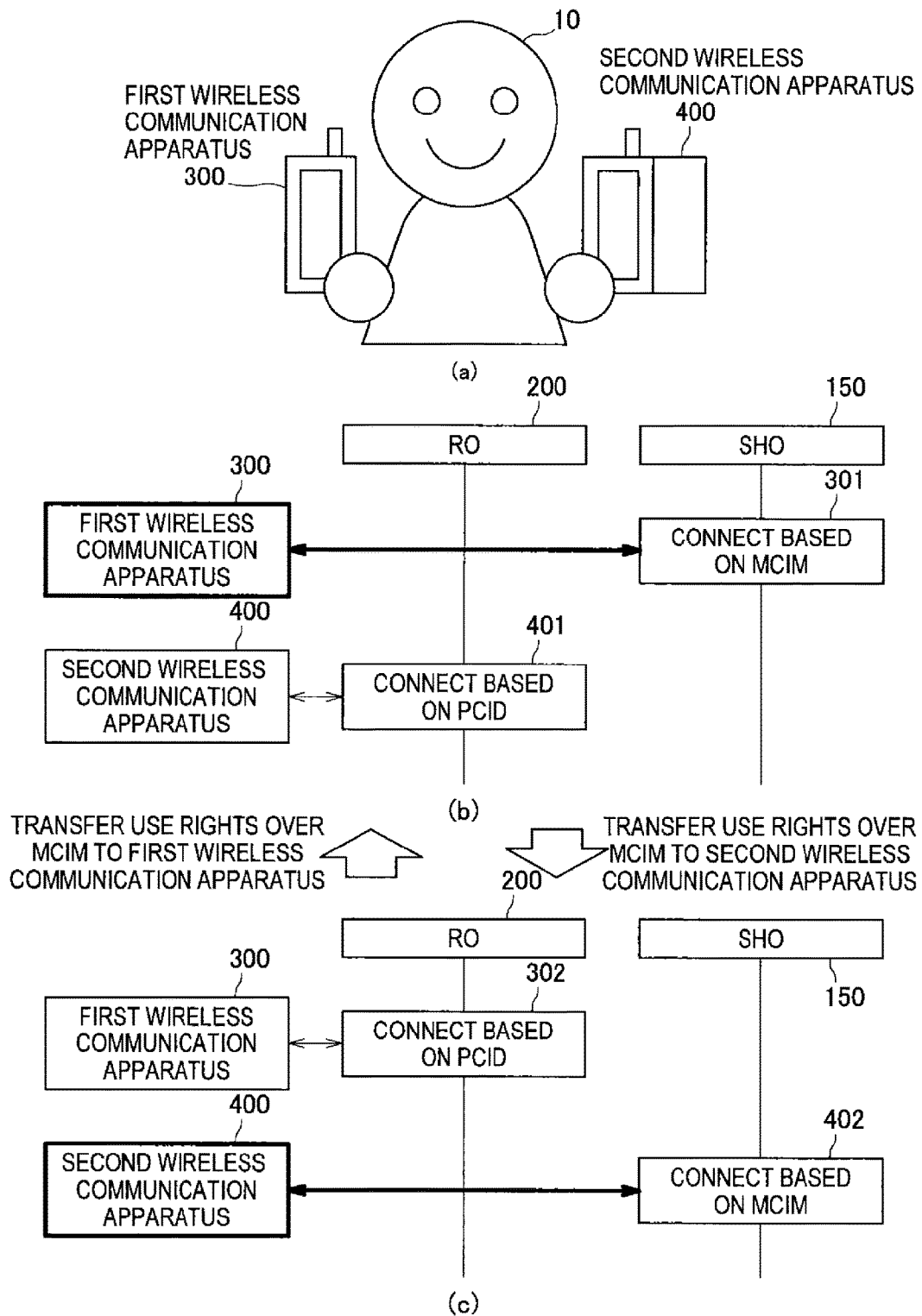

[Fig. 2]
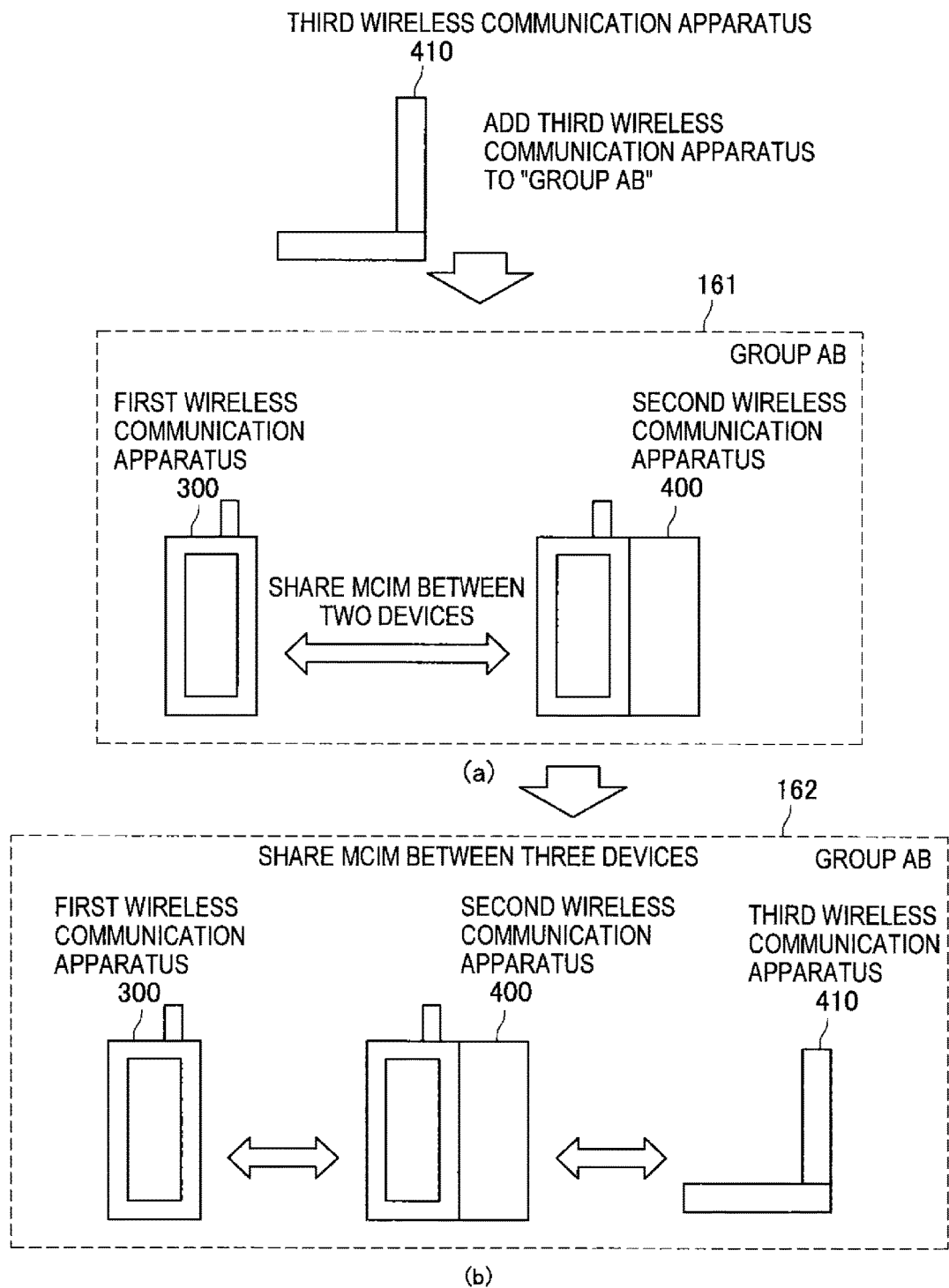

[Fig. 3]
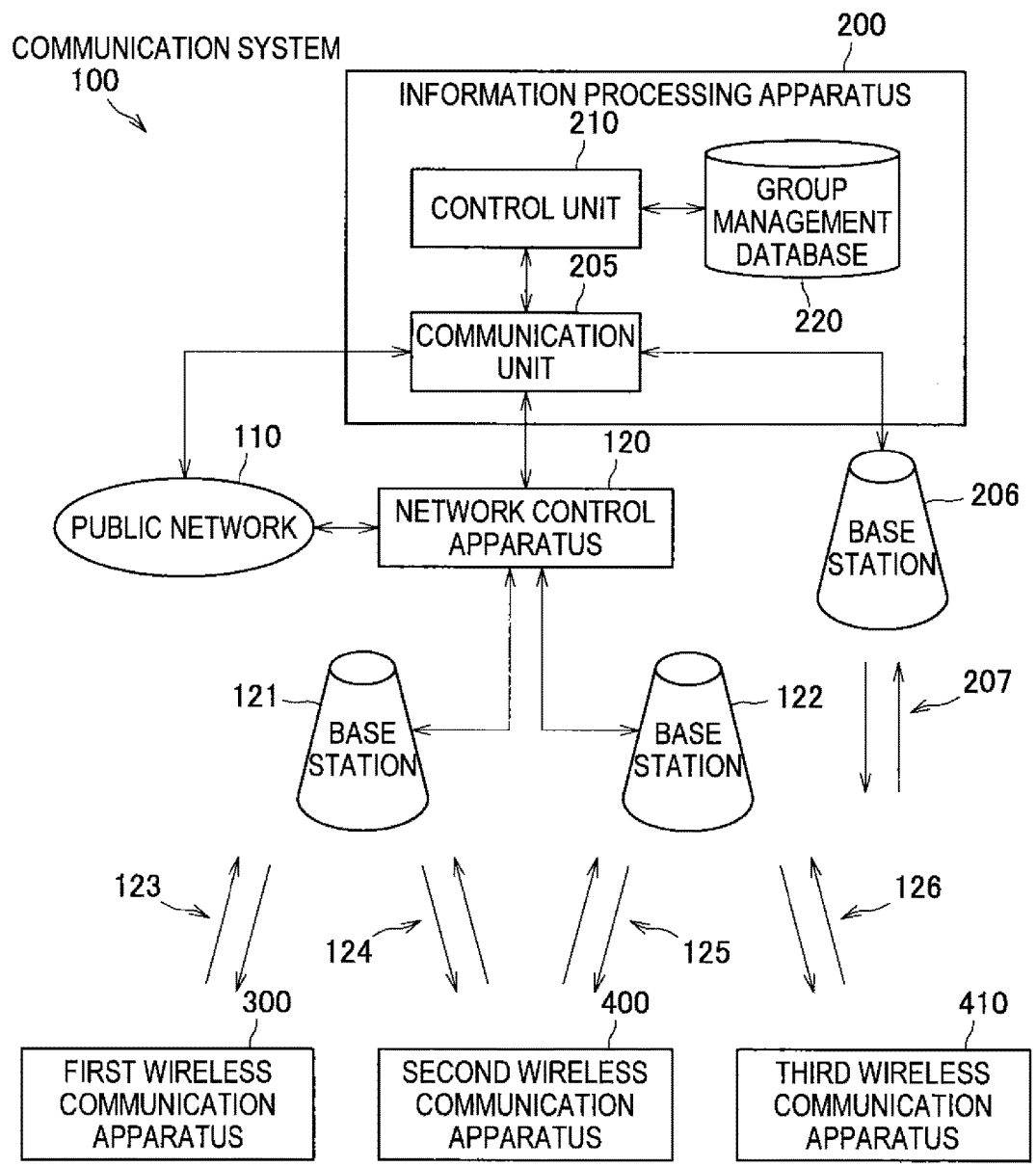

[Fig. 4]

GROUP MANAGEMENT DATABASE
220

| | GROUP NAME | GROUP ID | GROUP PASSWORD | DEVICE NAME | TERMINAL IDENTIFICATION INFORMATION | VALID/INVALID INFORMATION | APPROVAL STATE |
|---|---|---|---|---|---|---|---|
| | 221 | 222 | 223 | 224 | 225 | 226 | 227 |
| 1 | GROUP AB | 123456789 | poiuytr | MY MOBILE | PCID#1 | VALID | APPROVED |
| | | | | MY E-BOOK READER | PCID#2 | INVALID | APPROVED |
| 2 | ... | ... | ... | ... | ... | ... | ... |
| ⋮ | ⋮ | ⋮ | ⋮ | ⋮ | ⋮ | ⋮ | ⋮ |
| M | ... | ... | ... | ... | ... | ... | ... |

(a) ⇩ PROVISIONALLY REGISTER THIRD WIRELESS COMMUNICATION APPARATUS (PCID#3) IN "GROUP AB"

GROUP MANAGEMENT DATABASE
220

| | GROUP NAME | GROUP ID | GROUP PASSWORD | DEVICE NAME | TERMINAL IDENTIFICATION INFORMATION | VALID/INVALID INFORMATION | APPROVAL STATE |
|---|---|---|---|---|---|---|---|
| | 221 | 222 | 223 | 224 | 225 | 226 | 227 |
| 1 | GROUP AB | 123456789 | poiuytr | MY MOBILE | PCID#1 | VALID | APPROVED |
| | | | | MY E-BOOK READER | PCID#2 | INVALID | APPROVED |
| | | | 228 | MY COMPUTER | PCID#3 | - | UNAPPROVED |
| 2 | ... | ... | ... | ... | ... | ... | ... |
| ⋮ | ⋮ | ⋮ | ⋮ | ⋮ | ⋮ | ⋮ | ⋮ |
| M | ... | ... | ... | ... | ... | ... | ... |

GROUP MANAGEMENT DATABASE
220

| | GROUP NAME | GROUP ID | GROUP PASSWORD | DEVICE NAME | TERMINAL IDENTIFICATION INFORMATION | VALID/INVALID INFORMATION | APPROVAL STATE |
|---|---|---|---|---|---|---|---|
| | 221 | 222 | 223 | 224 | 225 | 226 | 227 |
| 1 | GROUP AB | 123456789 | poiuytr | MY MOBILE | PCID#1 | VALID | APPROVED |
| | | | | MY E-BOOK READER | PCID#2 | INVALID | APPROVED |
| | | | 228 | MY COMPUTER | PCID#3 | - | UNAPPROVED |
| 2 | ... | ... | ... | ... | ... | ... | ... |
| ⋮ | ⋮ | ⋮ | ⋮ | ⋮ | ⋮ | ⋮ | ⋮ |
| M | ... | ... | ... | ... | ... | ... | ... |

(a) ⇩ FULL REGISTRATION OF THIRD WIRELESS COMMUNICATION APPARATUS (PCID#3) IN "GROUP AB"

GROUP MANAGEMENT DATABASE
220

| | GROUP NAME | GROUP ID | GROUP PASSWORD | DEVICE NAME | TERMINAL IDENTIFICATION INFORMATION | VALID/INVALID INFORMATION | APPROVAL STATE |
|---|---|---|---|---|---|---|---|
| | 221 | 222 | 223 | 224 | 225 | 226 | 227 |
| 1 | GROUP AB | 123456789 | poiuytr | MY MOBILE | PCID#1 | VALID | APPROVED |
| | | | | MY E-BOOK READER | PCID#2 | INVALID | APPROVED |
| | | | 229 | MY COMPUTER | PCID#3 | INVALID | UNAPPROVED |
| 2 | ... | ... | ... | ... | ... | ... | ... |
| ⋮ | ⋮ | ⋮ | ⋮ | ⋮ | ⋮ | ⋮ | ⋮ |
| M | ... | ... | ... | ... | ... | ... | ... |

(b)

[Fig. 6]
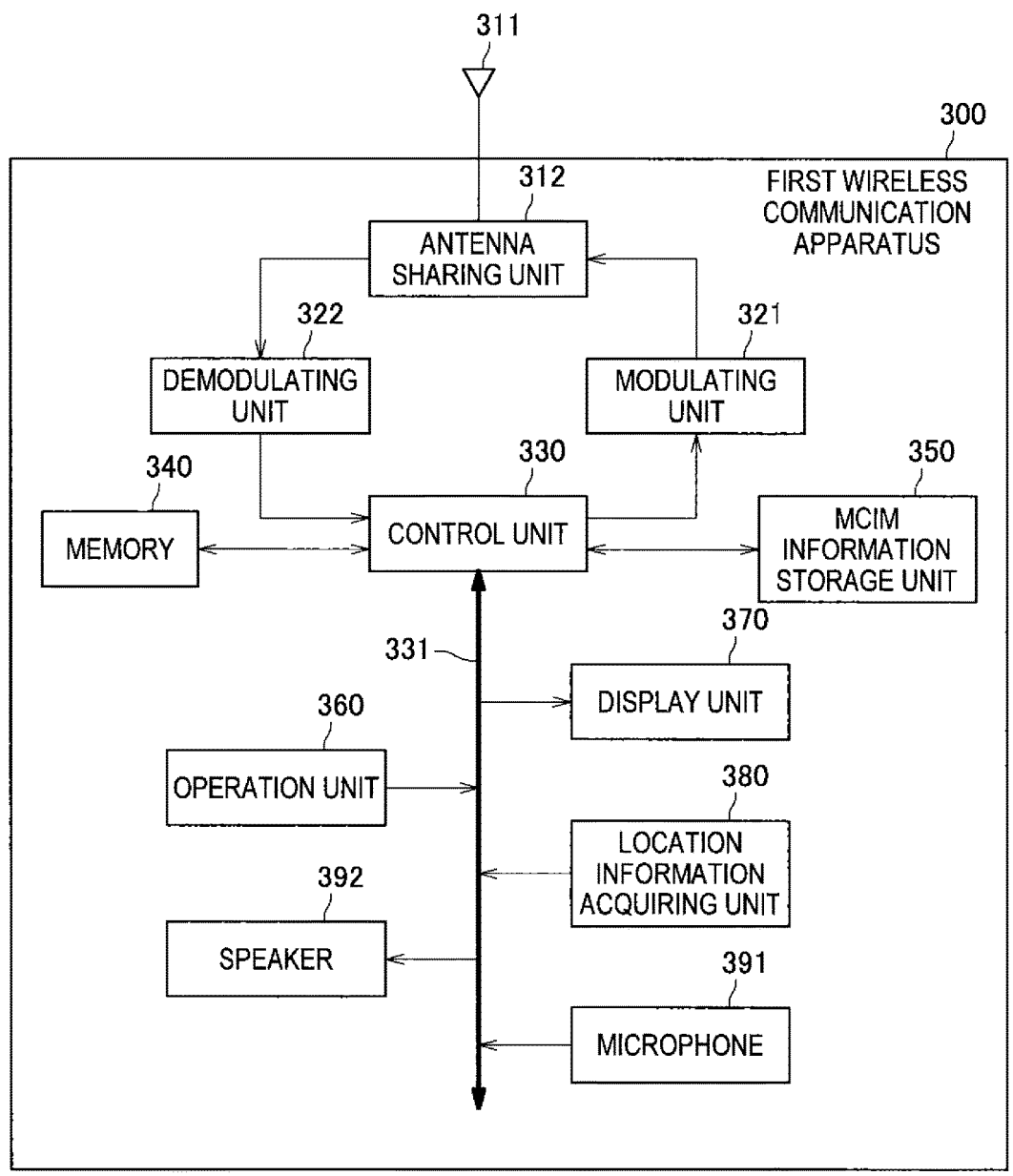

Please input ID and password of group subject to addition request and press the confirm button.

GROUP ID — 123456789 —501

GROUP PASSWORD — ★★★★★★ —502

503　　504

CONFIRM　　RETURN (a)

505

Please input ID and password of group for database confirmation request and press the confirm button.

GROUP ID — 123456789 —501

GROUP PASSWORD — ★★★★★★ —502

503　　504

CONFIRM　　RETURN (b)

[Fig. 8]
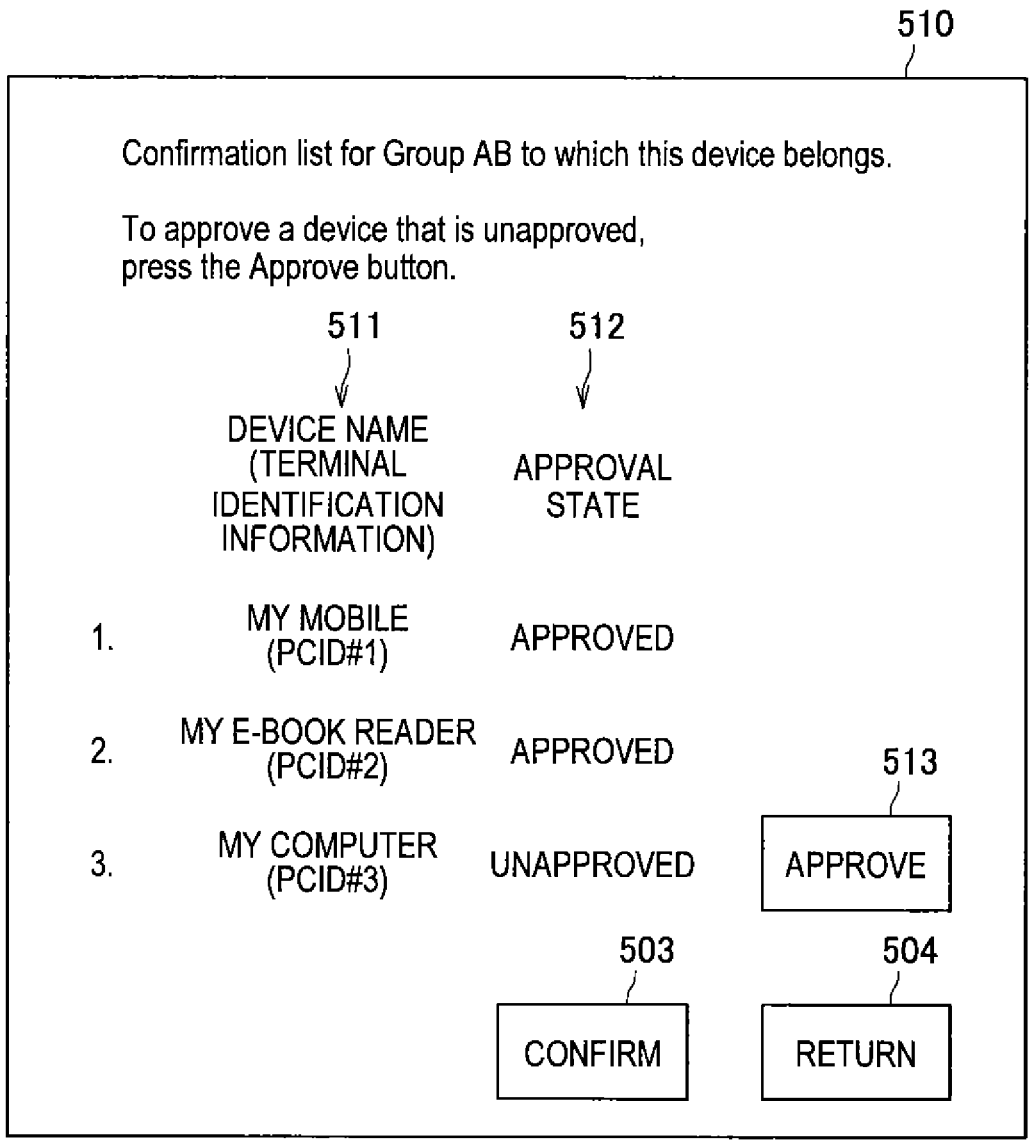

[Fig. 9]
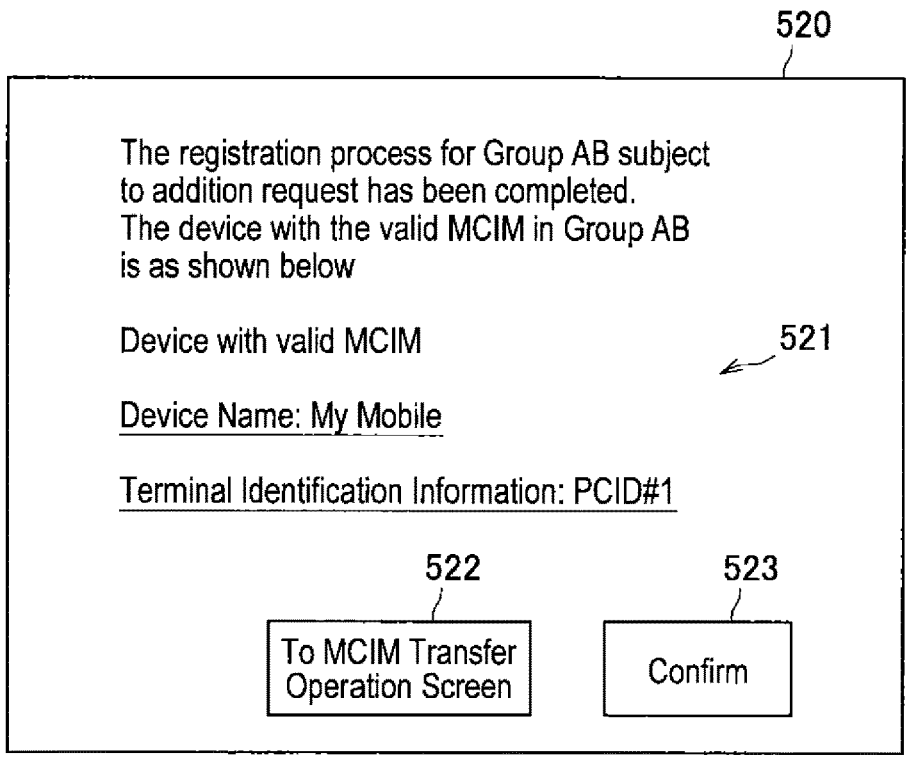
(a)
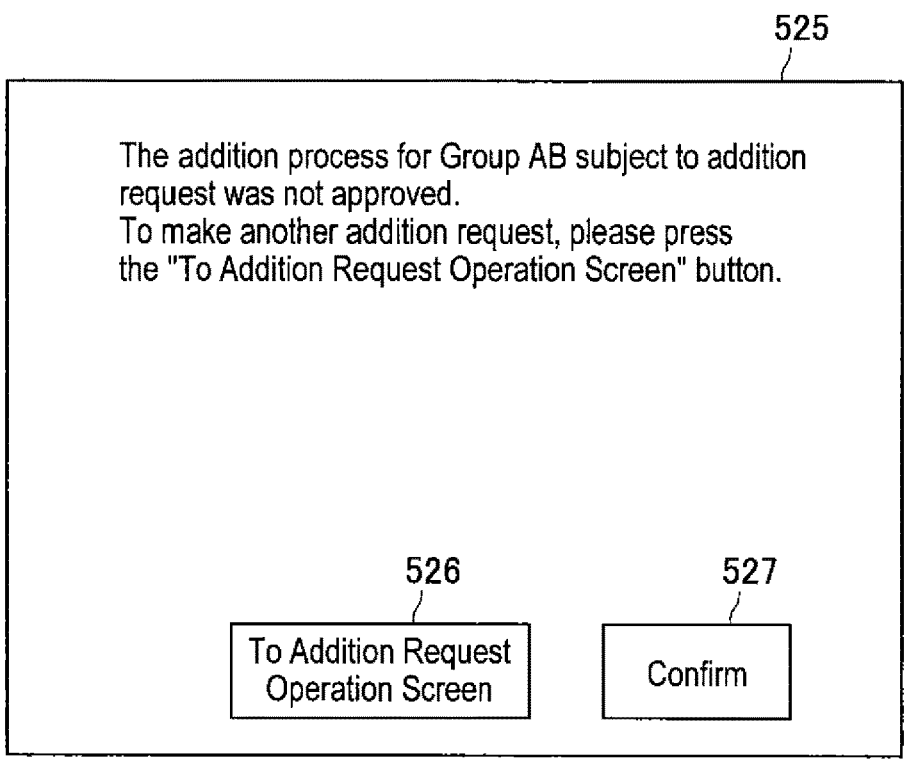
(b)

[Fig. 10]
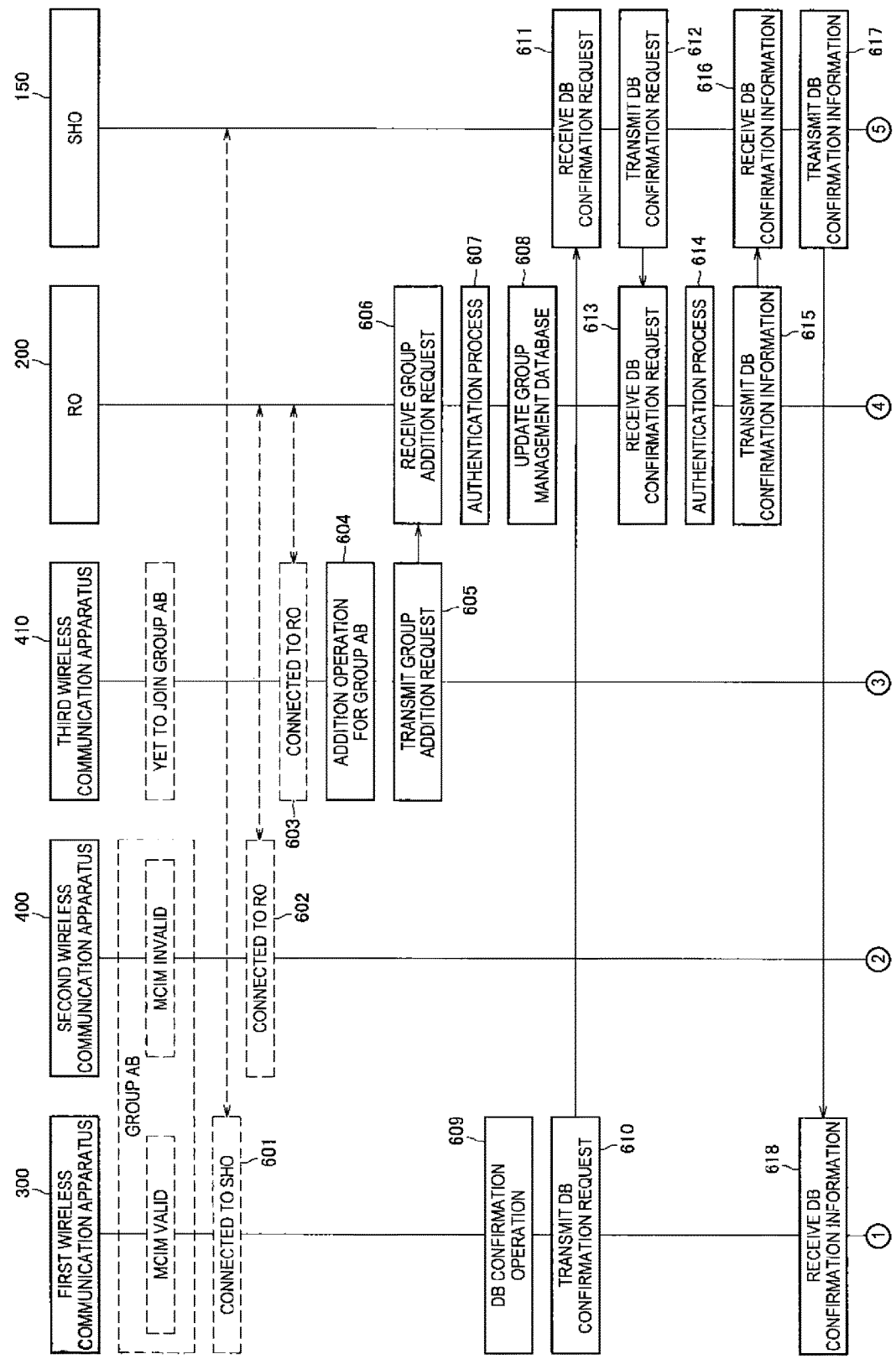

[Fig. 11]
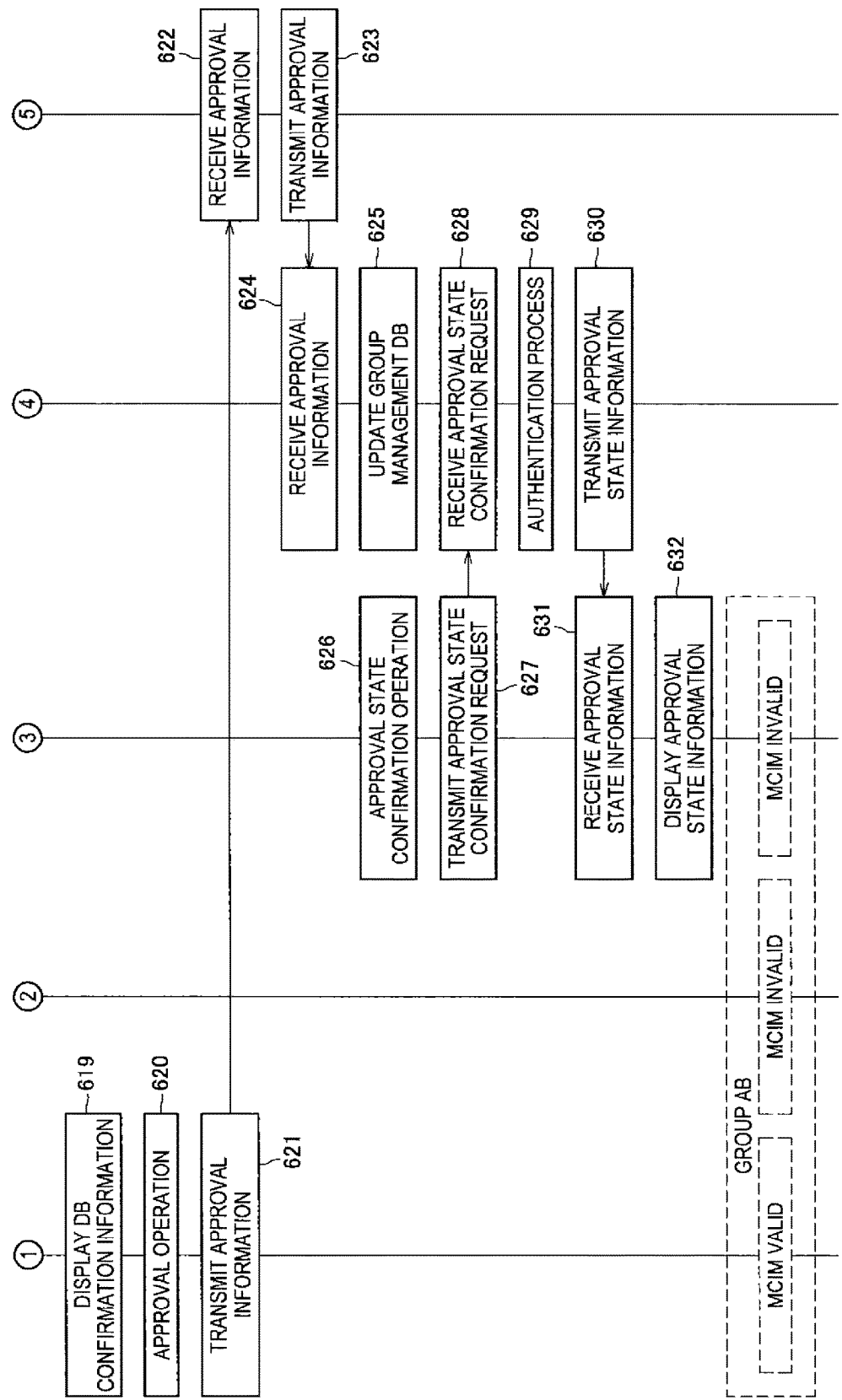

[Fig. 12]
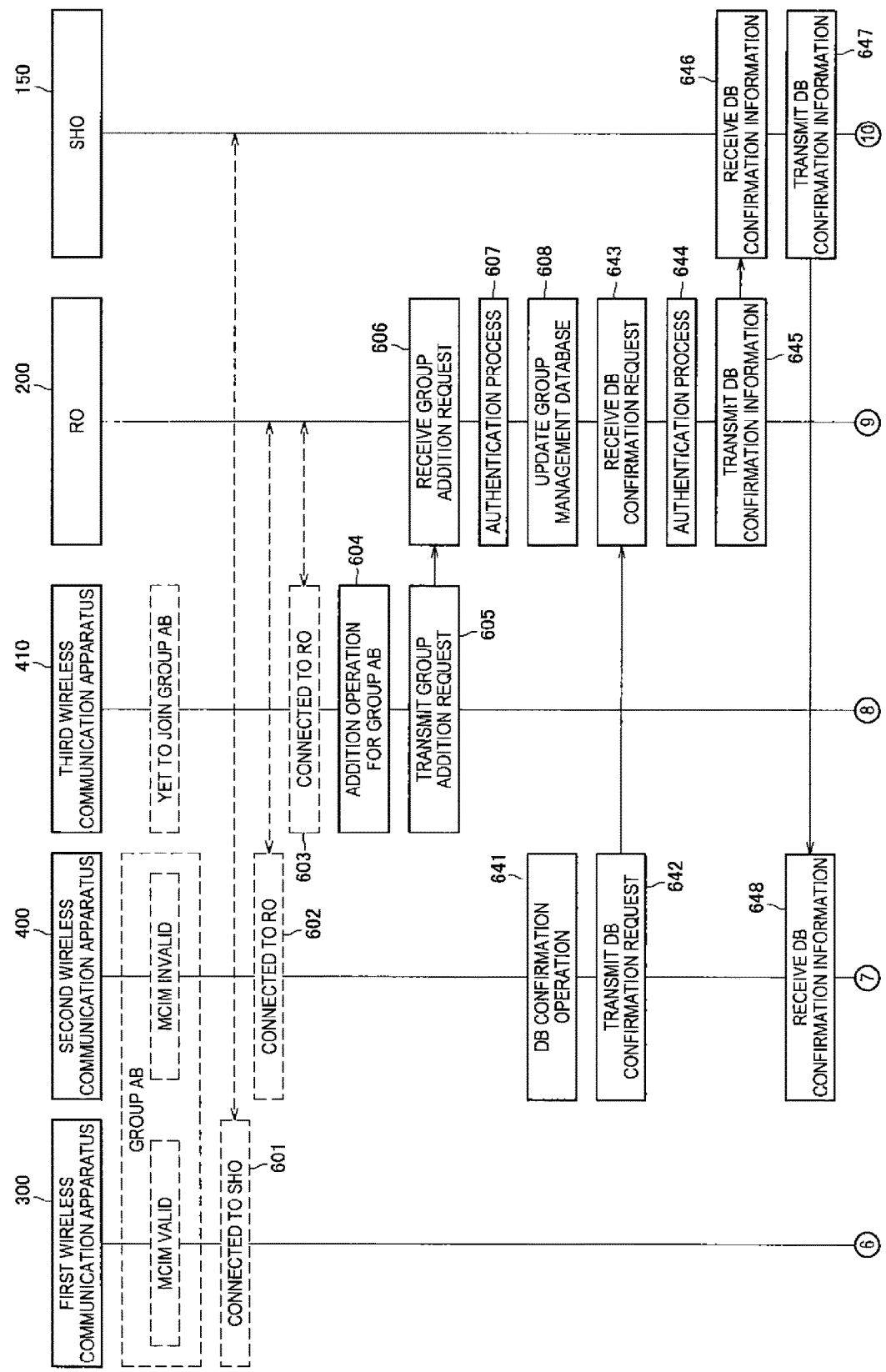

[Fig. 13]
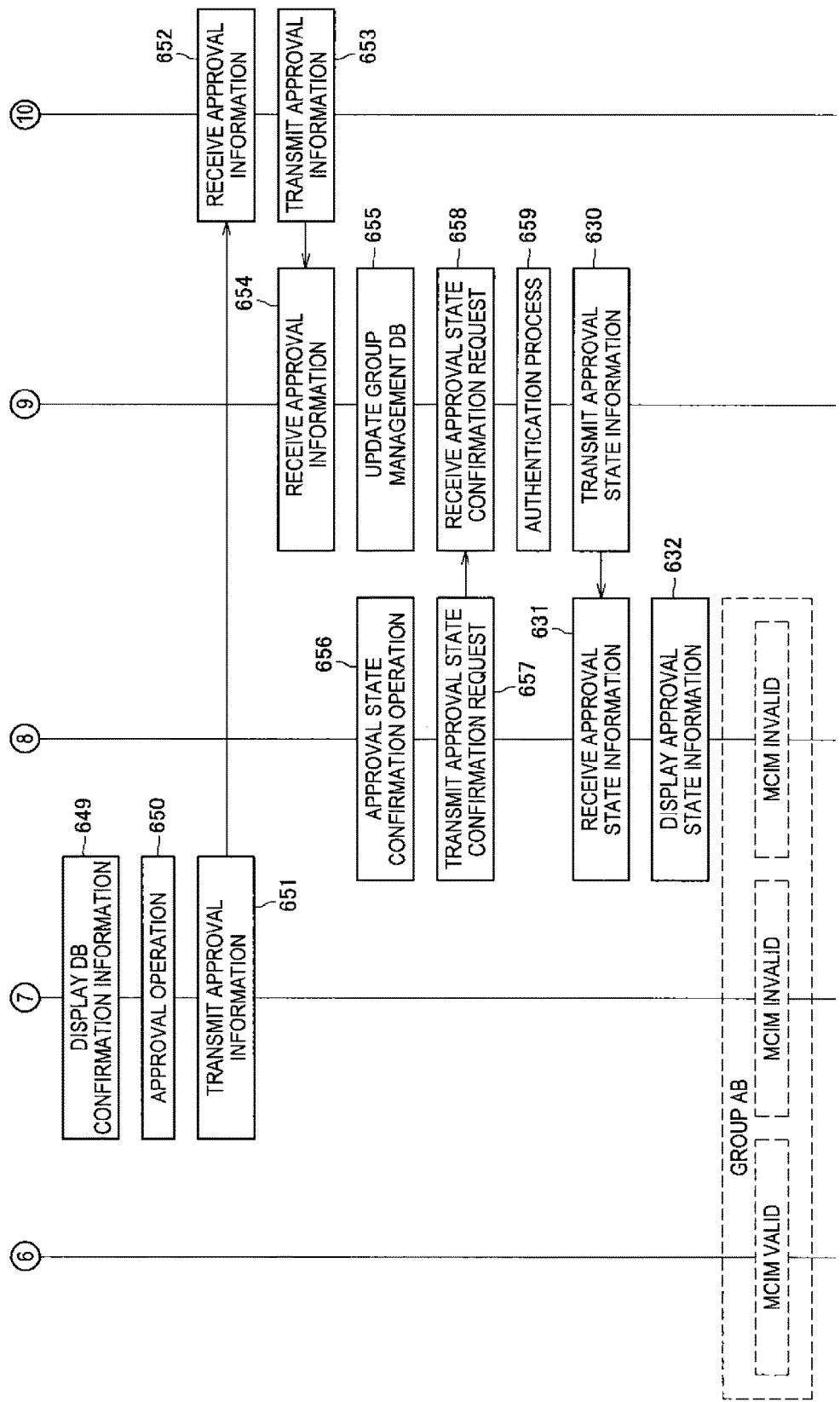

[Fig. 14]
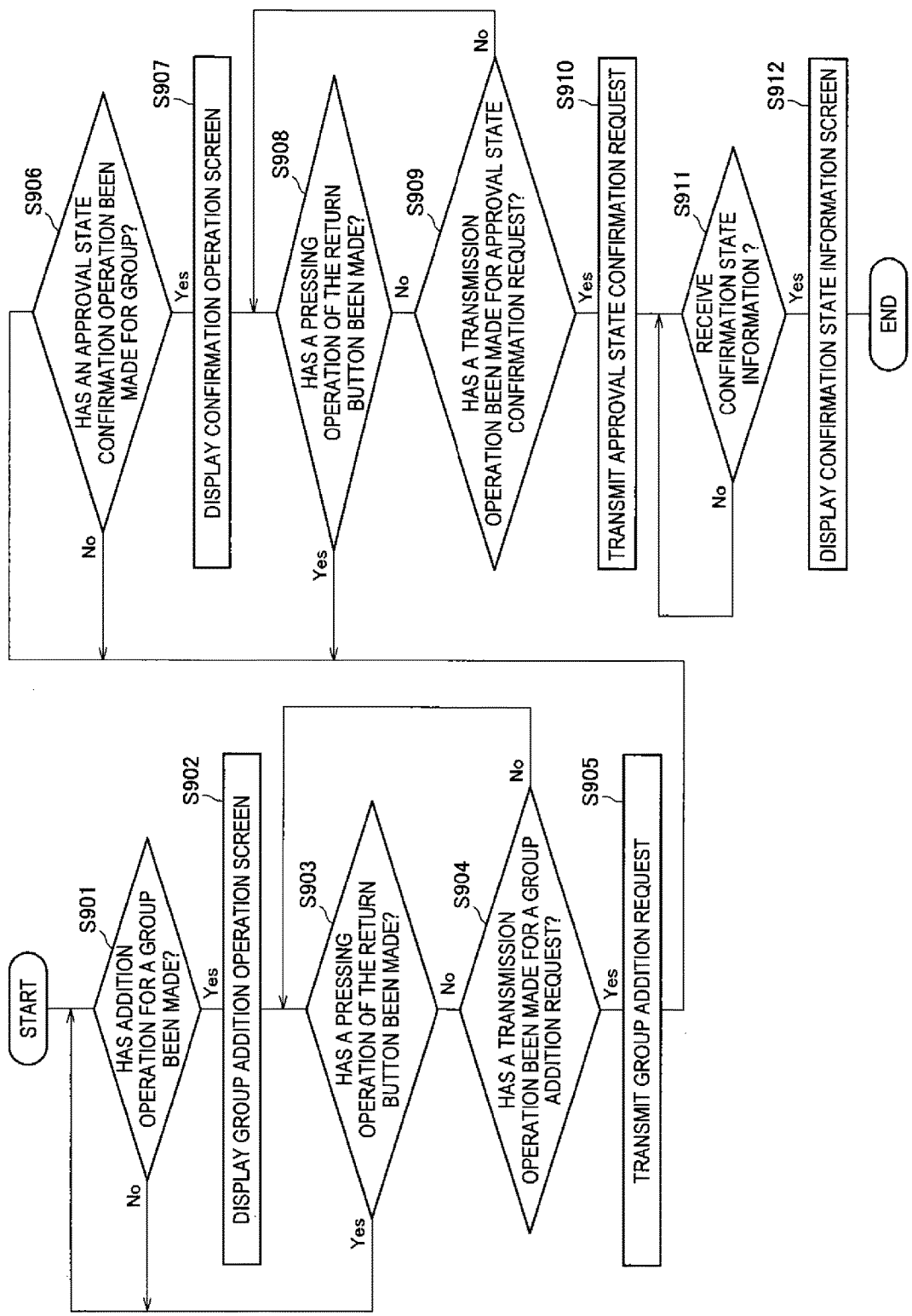

[Fig. 15]
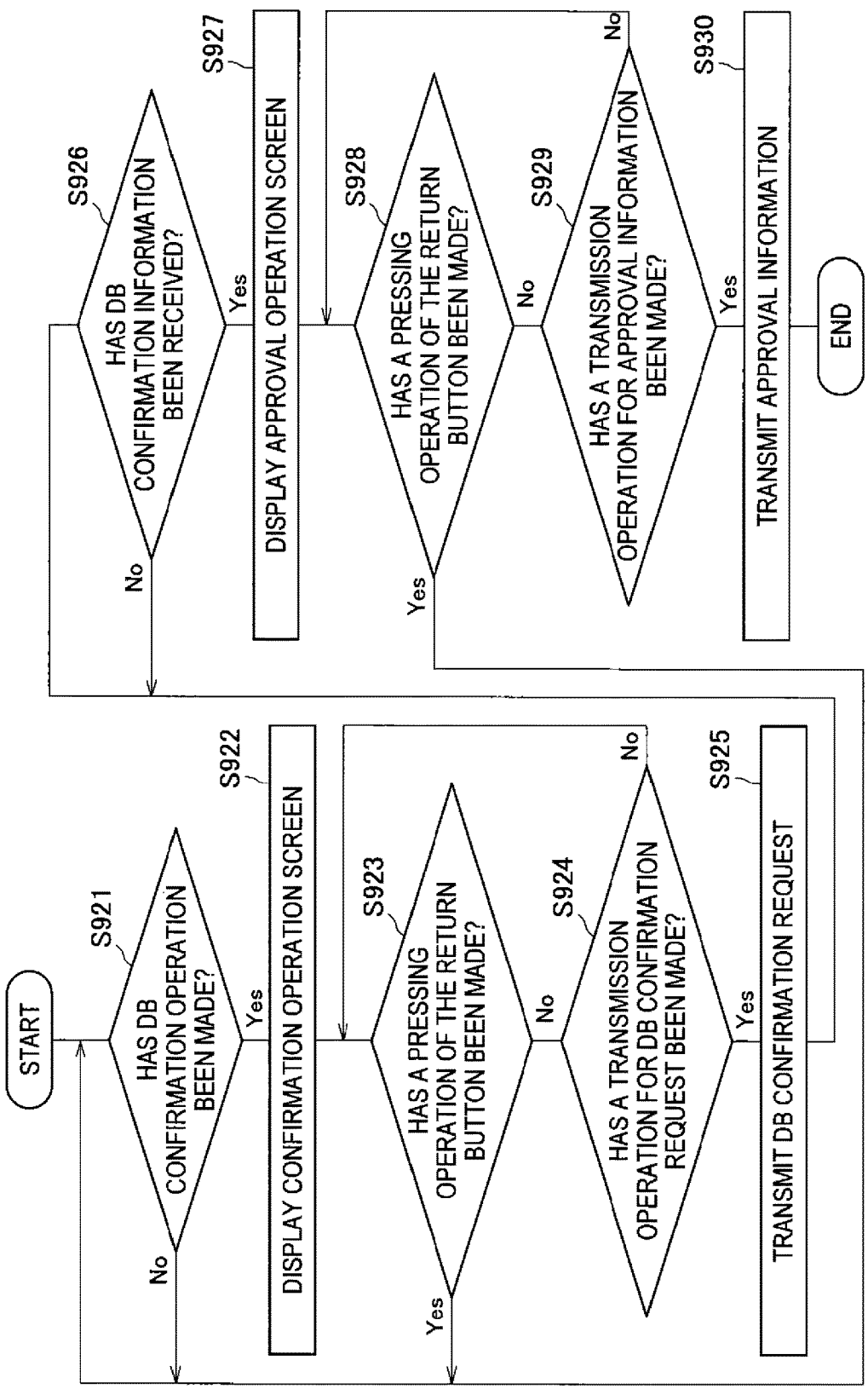

[Fig. 16]
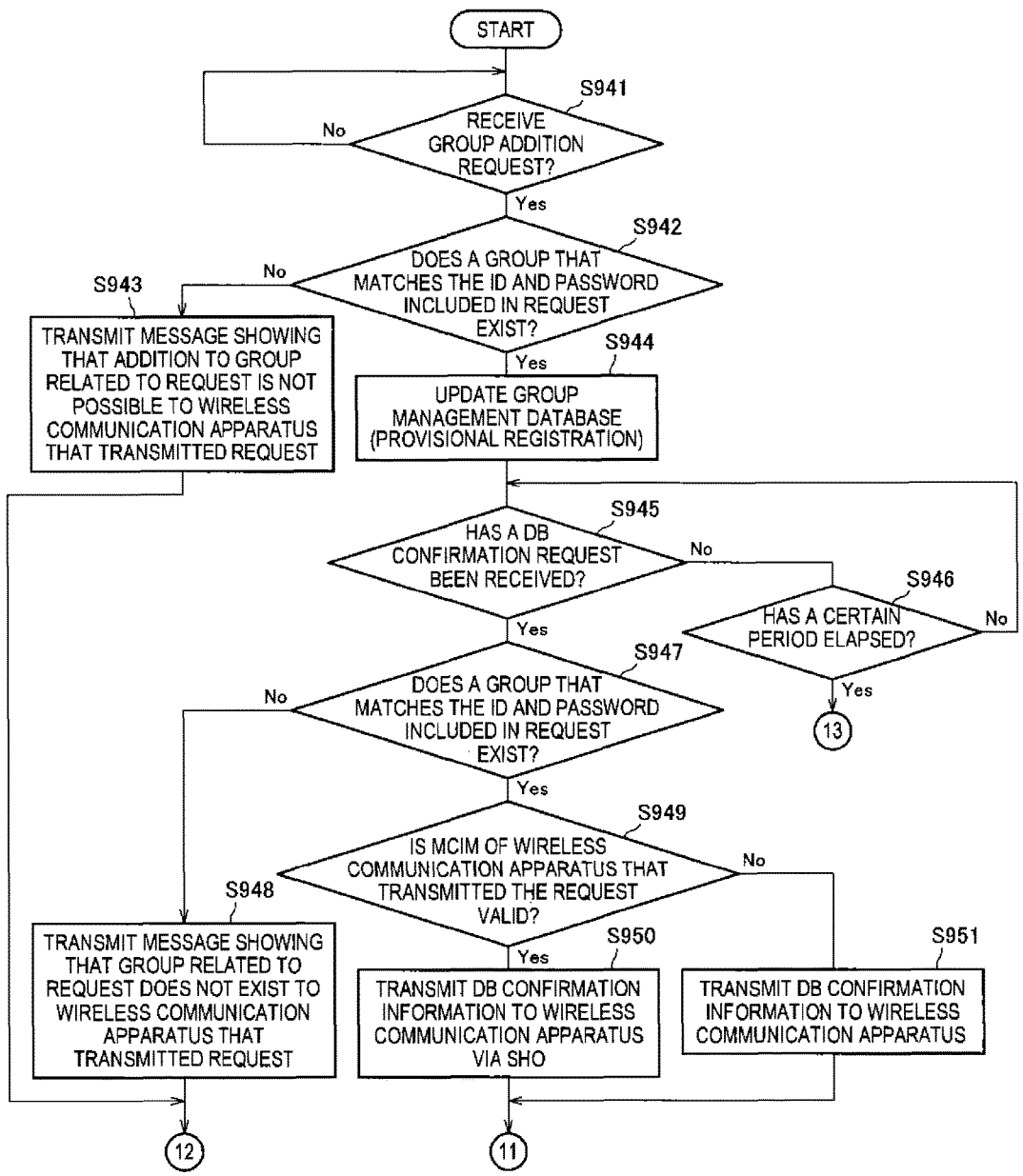

[Fig. 17]
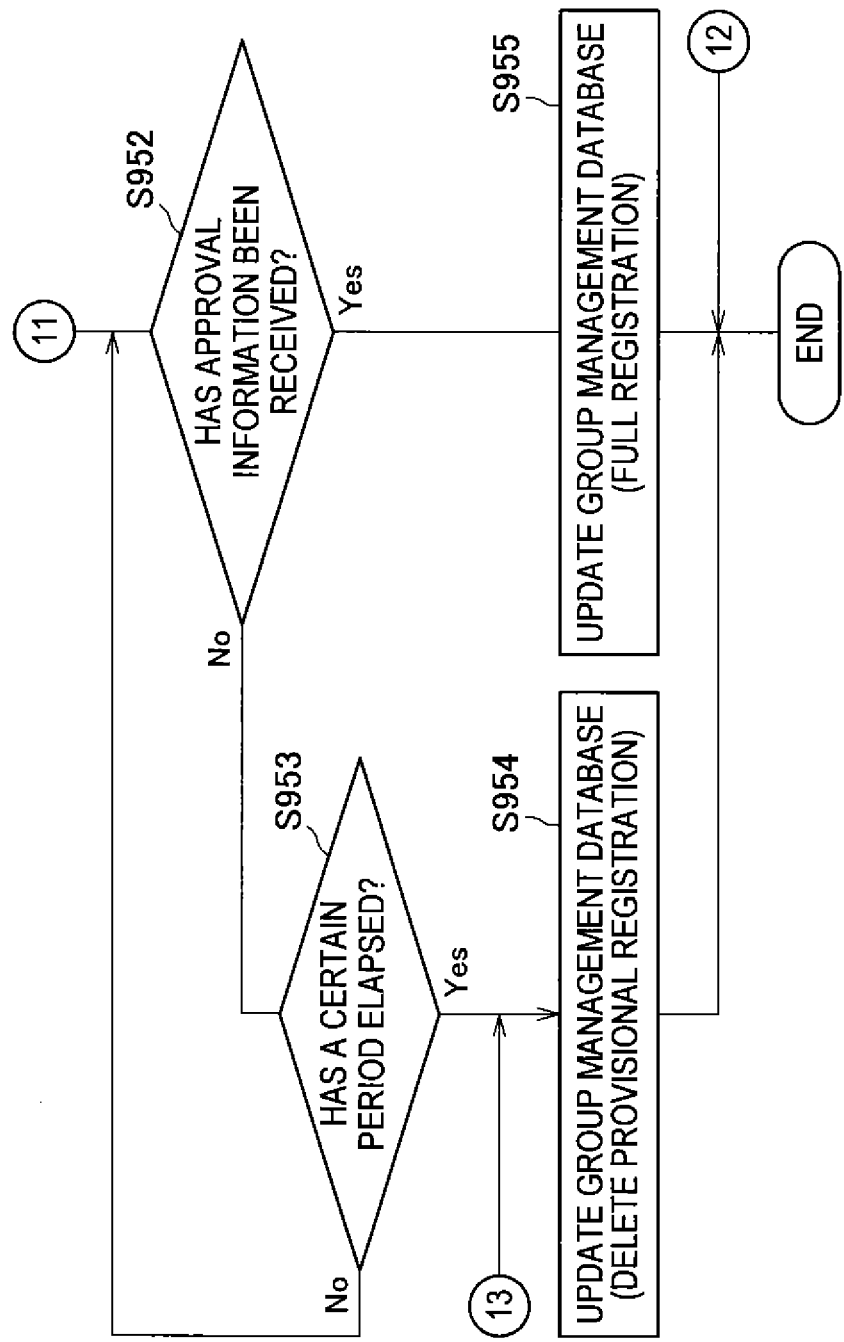

[Fig. 18]
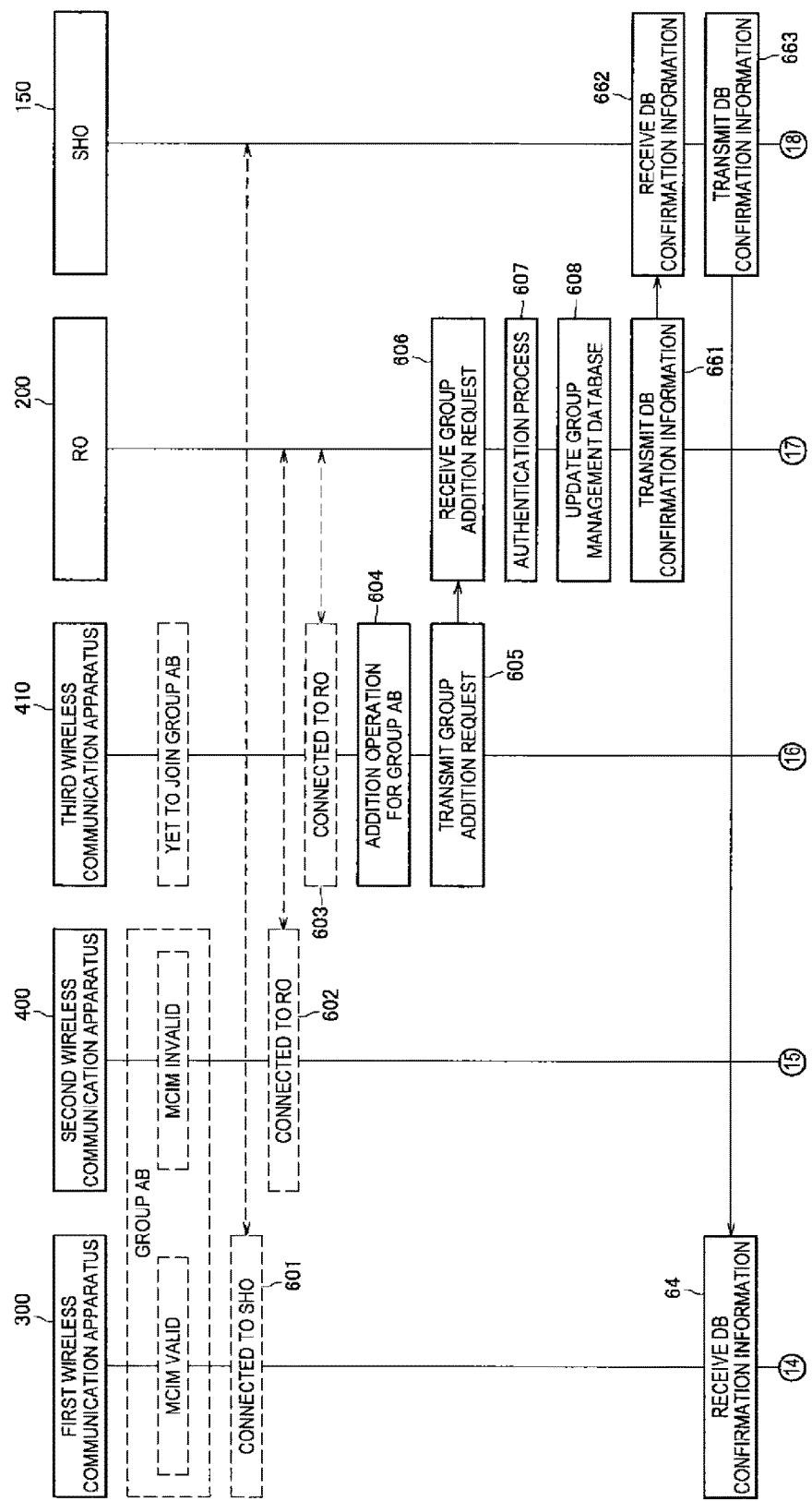

[Fig. 19]
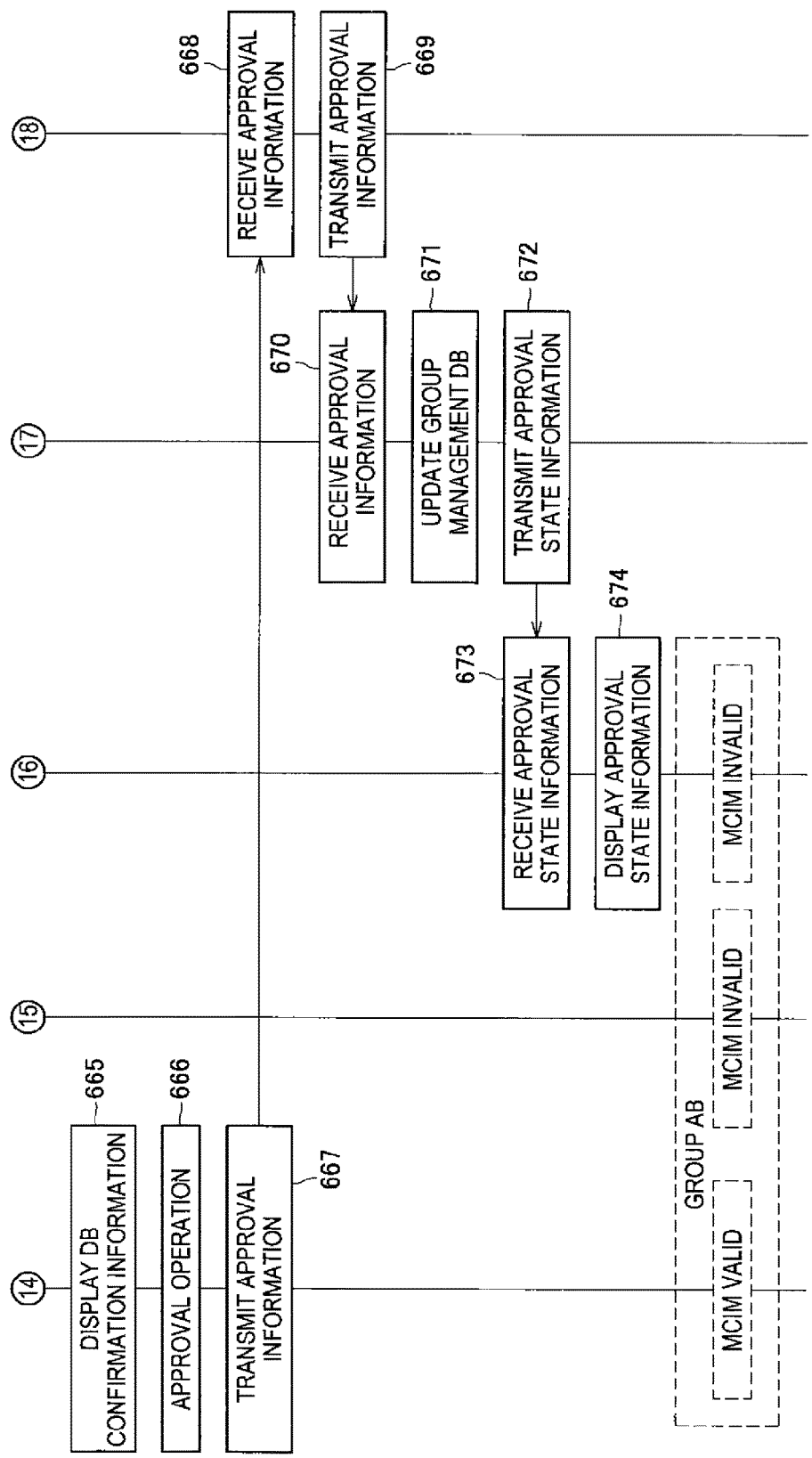

[Fig. 20]
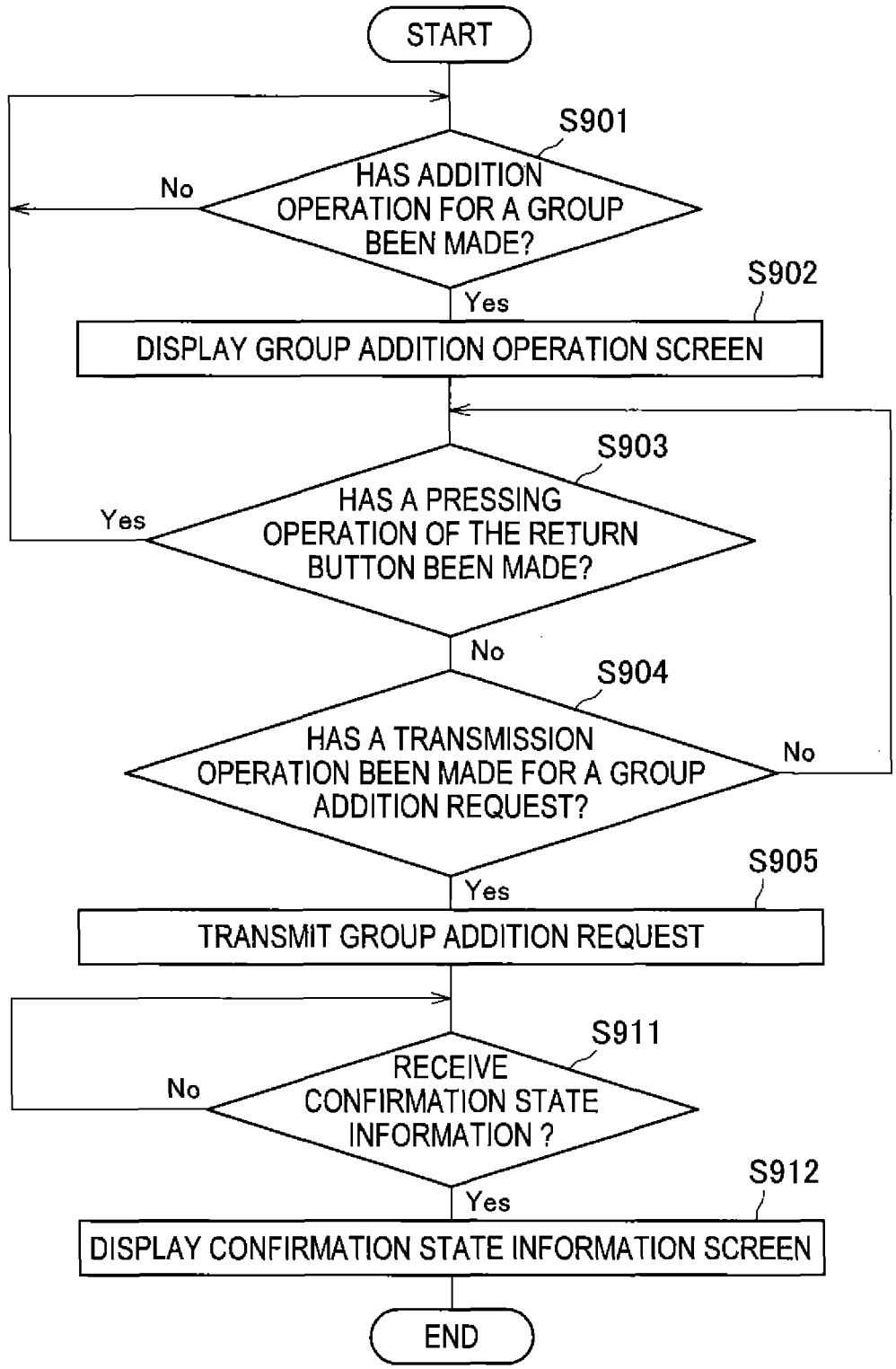

[Fig. 21]
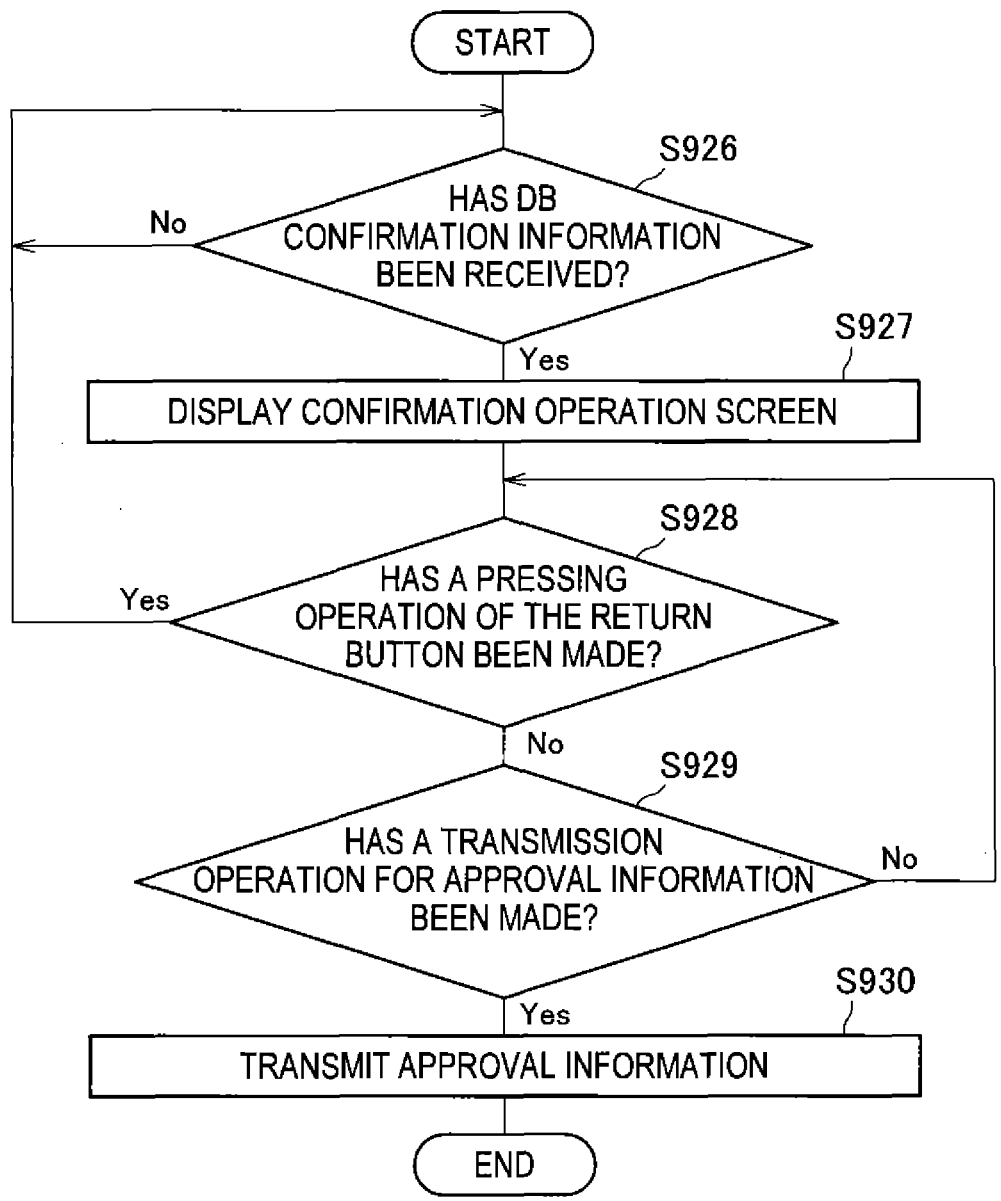

[Fig. 22]
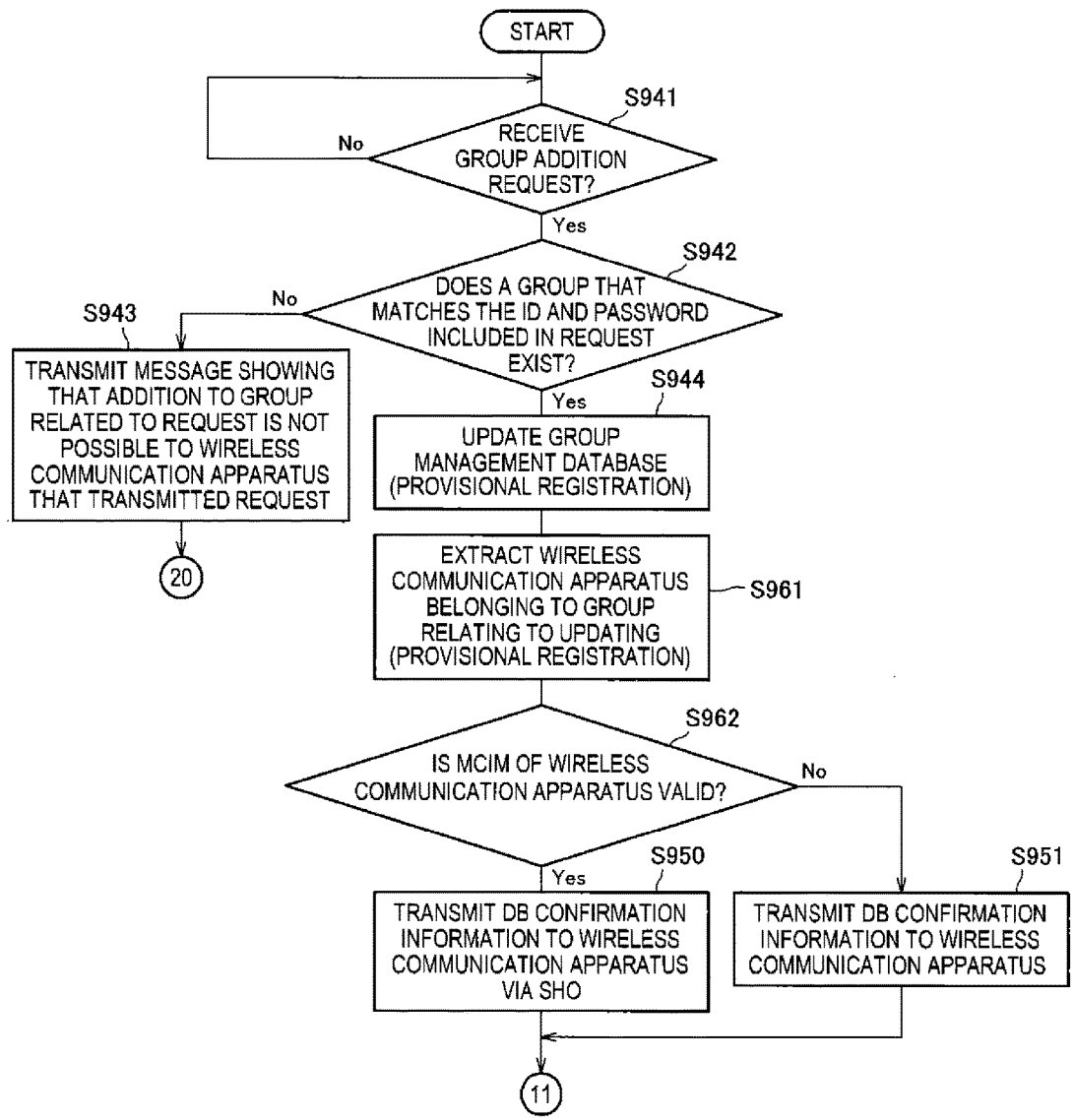

[Fig. 23]
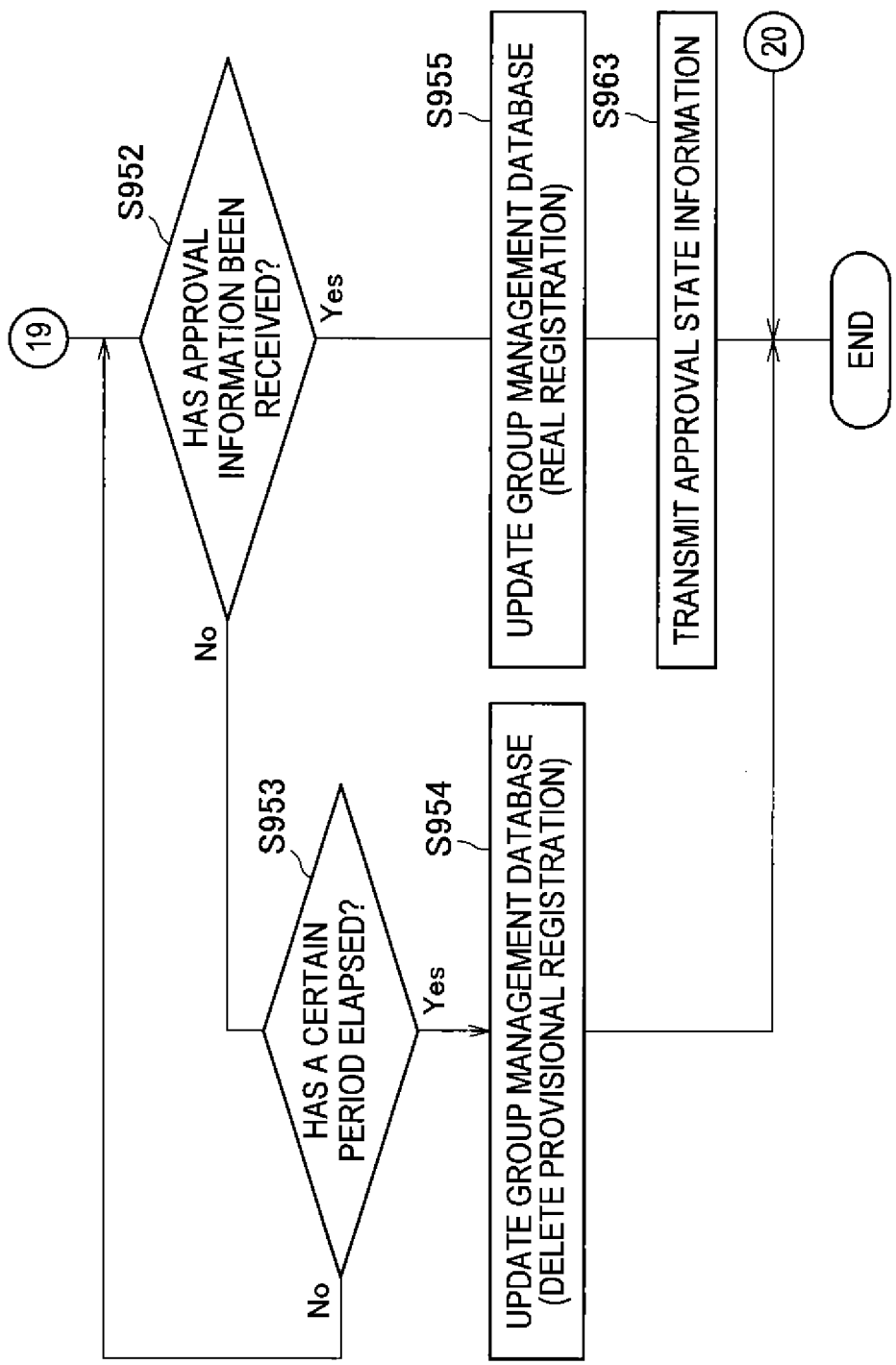

[Fig. 24]
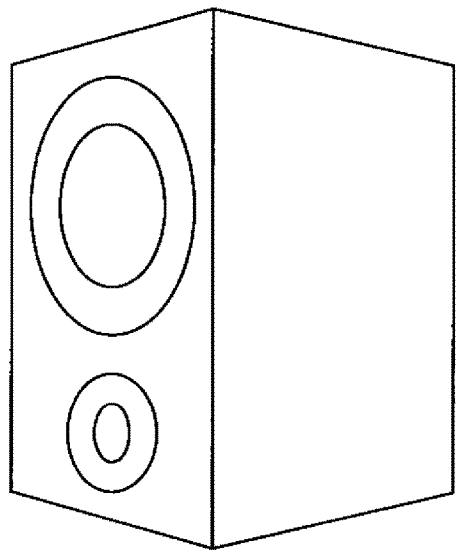
(a)
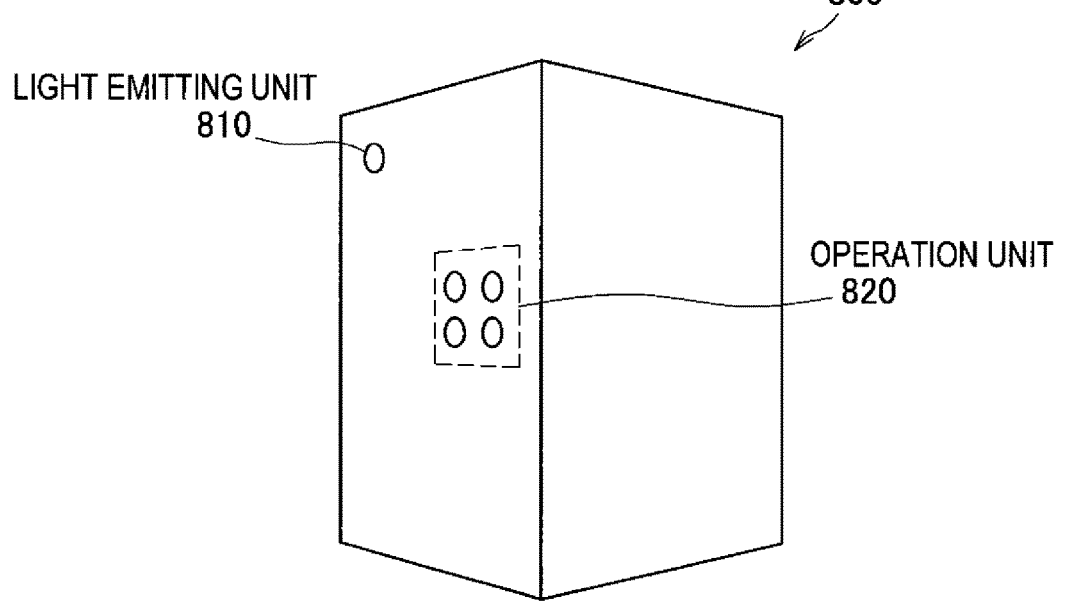
(b)

WIRELESS COMMUNICATION APPARATUS, INFORMATION PROCESSING APPARATUS, COMMUNICATION SYSTEM, AND CONTROL METHOD FOR WIRELESS COMMUNICATION APPARATUS

TECHNICAL FIELD

Cross-Reference to Related Applications

This application is based upon and claims the benefit of priority from Japanese Patent Application JP 2011-134683, filed on Jun. 17, 2011, the entire contents of which are hereby incorporated by reference.

The present disclosure relates to a wireless communication apparatus that connects to a network using corresponding connection rights, an information processing apparatus, a communication system, and a method.

BACKGROUND ART

At present, expanded functionality is being considered for 3rd Generation Partnership Project (3GPP) that decides the technical specification of public wireless communication networks (see for example, 3GPP TR 33.812 V9.2.0 (2010-06)).

By using such expanded functionality (referred to as "Machine to Machine Equipment"), it will become possible to flexibly use information showing what services can be utilized. Such information showing what services can be utilized is known as a Machine Communication Identity Module (MCIM). As examples, it is possible to download an MCIM from a network or to temporarily invalidate and then revalidate an MCIM.

At present, information corresponding to an MCIM needs to be stored in a physical device called a Subscriber Identity Module (SIM) card. However, if an MCIM could be handled as software, the method of storage could be made more flexible.

SUMMARY

Technical Problem

By using the expanded functionality described above, it may be to conceive new methods of using an MCIM that differ to the past.

For example, in an exemplary embodiment, it may be possible for an MCIM to be shared by a plurality of wireless communication apparatuses. In such case, it is important for the operations relating to sharing to be easy to carry out and for security to be maintained when sharing the MCIM.

Exemplary embodiments of the present disclosure were conceived in view of the above and aim to share the right to connect to a network between a plurality of wireless communication apparatuses and to maintain security for such sharing.

Solution to Problem

Consistent with an exemplary embodiment, an information processing apparatus includes a receiving unit configured to receive, from a first communications device, a request to join a group of second communications devices. The second communications devices may be associated with at least one shared connection right. A control unit may be configured to provisionally transfer the shared connection right to the first communications device, in response to the received request.

Consistent with a further exemplary embodiment, a computer-implemented method receives, from a first communications device, a request to join a group of second communications devices. The second communications devices may be associated with at least one shared connection right. Using a processor, an instructions is generated to provisionally transfer the shared connection right to the first communications device, in response to the received request.

Consistent with another exemplary embodiment, a tangible, non-transitory computer-readable medium stores instructions that, when executed by at least one processor, cause the at least one processor to perform a method that includes receiving, from a first communications device, a request to join a group of second communications devices. The second communications devices may be associated with at least one shared connection right. The method further includes generating an instruction to provisionally transfer the shared connection right to the first communications device, in response to the received request Consistent with an additional exemplary embodiment, a communications device includes a control unit configured to generate an instruction to transmit, to an information processing apparatus, a request to join a group of additional communications devices. The additional communications devices may be associated with at least one shared connection right. The control unit is further configured to establish the shared connection right with the group of additional communications devices, in response to approval information provided by at least one of the additional communications devices.

Consistent with a further exemplary embodiment, a computer-implemented method includes generating an instruction to transmit, to an information processing apparatus, a request to join a group of additional communications devices. The additional communications devices may be associated with at least one shared connection right. The method further includes establishing, using a processor, the shared connection right with the group of additional communications devices, in response to approval information provided by at least one of the additional communications devices.

Consistent with yet another exemplary embodiment, a tangible, non-transitory computer-readable medium stores instructions that, when executed by at least one processor, cause the at least one processor to perform a method that includes generating an instruction to transmit, to an information processing apparatus, a request to join a group of additional communications devices. The additional communications devices may be associated with at least one shared connection right. The method further includes establishing, using a processor, the shared connection right with the group of additional communications devices, in response to approval information provided by at least one of the additional communications devices.

Consistent with another exemplary embodiment, a communications system includes a first communications device configured to generate an instruction to transmit a request to join a group of second communications devices associated with at least one shared connection right. The communication system further includes an information processing apparatus having a receiving unit configured to receive, from the first communications device, the request to join a group of second communications devices, and a control unit configured to provisionally transfer the shared connection right to the first communications device, in response to approval information provided by at least one of the additional communications devices.

ADVANTAGEOUS EFFECTS OF INVENTION

According to the disclosed exemplary embodiments, it may be possible to bring an effect that shares the right to connect to a network between a plurality of wireless communication apparatuses and to maintain security for such sharing.

BRIEF DESCRIPTION OF DRAWINGS

FIGS. 1(a)-1(c) illustrate an exemplary usage of a plurality of wireless communication apparatuses or devices, according to a first exemplary embodiment.

FIGS. 2(a) and 2(b) are simplified diagrams showing an exemplary group of wireless communications apparatuses that share an MCIM, according to the first exemplary embodiment.

FIG. 3 is a diagram of an exemplary communication system, according to the first exemplary embodiment.

FIGS. 4(a) and 4(b) illustrate an exemplary group management database, according to the first exemplary embodiment.

FIGS. 5(a) and 5(b) illustrate an exemplary group management database, according to the first exemplary embodiment.

FIG. 6 is a block diagram showing of an exemplary internal configuration of a wireless communication apparatus 300, according to the first exemplary embodiment.

FIGS. 7(a) and 7(b) illustrate exemplary display screens displayed on display units the wireless communication apparatuses, according to the first exemplary embodiment.

FIG. 8 illustrates an exemplary display screen displayed on a display unit of a first wireless communication apparatus, according to the first exemplary embodiment.

FIGS. 9(a) and 9(b) illustrate exemplary display screens displayed on a display unit of a wireless communication apparatus, according to the first exemplary embodiment.

FIG. 10 is a flowchart of an exemplary communications process performed by a communication system, according to the first exemplary embodiment.

FIG. 11 is a flowchart of an exemplary communications process performed by a communication system, according to the first exemplary embodiment.

FIG. 12 is a flowchart of an exemplary communications process performed by a communication system, according to the first exemplary embodiment.

FIG. 13 is a flowchart of an exemplary communications process performed by a communication system, according to the first exemplary embodiment.

FIG. 14 is a flowchart of an exemplary communications process performed by a wireless communication apparatus, according to the first exemplary embodiment.

FIG. 15 is a flowchart of an exemplary communications process performed by a wireless communication apparatus, according to the first exemplary embodiment.

FIG. 16 is a flowchart of an exemplary communications process performed by an information processing apparatus, according to the first exemplary embodiment FIG. 17 is a flowchart of an exemplary communications process performed by an information processing apparatus, according to the first exemplary embodiment FIG. 18 is a flowchart of an exemplary communications process performed by a communication system, according to a second exemplary embodiment.

FIG. 19 is a flowchart of an exemplary communications process performed by a communication system, according to the second exemplary embodiment.

FIG. 20 is a flowchart of an exemplary communications process performed by a wireless communication apparatus, according to the second exemplary embodiment.

FIG. 21 is a flowchart of an exemplary communications process performed by a wireless communication apparatus, according to the second exemplary embodiment.

FIG. 22 is a flowchart of an exemplary communications process performed by an information processing apparatus, according to the second exemplary embodiment.

FIG. 23 is a flowchart of an exemplary communications process performed by an information processing apparatus, according to the second exemplary embodiment.

FIGS. 24(a) and 24(b) illustrate an exemplary configuration of a speaker apparatus, according to an exemplary embodiment.

DESCRIPTION OF EMBODIMENTS

Hereinafter, exemplary embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. In this application, the use of the singular includes the plural unless specifically stated otherwise, and the use of "or" means "and/or" unless stated otherwise. Additionally, the section headings used herein are for organizational purposes only, and are not to be construed as limiting the subject matter described.

Exemplary embodiments of the present disclosure will now be described in the order stated below.

1. First Embodiment (Group Addition Control: Example of Adding a New Device to a Group Sharing an MCIM (Machine Communication Identity Module));

2. Second Embodiment (Group Addition Control: Example of Notification of Provisional Registration and Full Registration of a New Device); and 3. Modifications 1. First Embodiment a. Example Usage of Wireless Communication Apparatuses FIGS. 1(a) to 1(c) illustrate an exemplary usage of a plurality of wireless communication apparatuses or devices, according to a first exemplary embodiment of the present disclosure.

FIG. 1(a) shows a state where a plurality of wireless communication apparatuses (a first wireless communication apparatus 300 and a second wireless communication apparatus 400) are used by a user 10. As examples, the first wireless communication apparatus 300 is a mobile telephone apparatus (for example, a "smartphone") and the second wireless communication apparatus 400 is an electronic book display apparatus equipped with a wireless communication function.

FIGS. 1(b) and 1(c) show an example of how use rights for an MCIM (Machine Communication Identity Module) are transferred when the MCIM is shared between a plurality of wireless communication apparatuses. In the first embodiment of the present disclosure, an example network configuration composed of a Selected Home Operator (SHO)

150 and a Registration Operator (RO) 200 is shown (see, for example, 3GPP TR 33.812 V9.2.0 (2010-06)).

The SHO 150 provides Internet services and the like, and as one example corresponds to a wireless communication provider (for example, a mobile telephone provider) that provides a wireless connection service. The RO 200 also provides services such as initial connection and registration and as one example corresponds to a wireless communication provider (for example, a mobile telephone provider) that provides a wireless connection service. The SHO 150 and the RO 200 are also connected and are capable of communicating with one another.

Note that RO and SHO represent logical roles and although a case where such devices are operated by different businesses is imagined, it would also be possible for the same business to operate both devices. It is also possible for multiple RO and SHO to be present. Also, RO and SHO may be configured as a single information processing apparatus or may be constructed of a plurality of apparatuses. Here, RO and SHO refer to relative roles with respect to a particular wireless communication apparatus in possession of a valid MCIM. This means that it is possible for a device that corresponds to an RO for one wireless communication apparatus to correspond to an SHO for a different wireless communication apparatus.

Here, in FIGS. 1(b) and 1(c), a wireless communication apparatus storing a valid MCIM is shown using a bold outline. That is, FIG. 1(b) shows a case where the first wireless communication apparatus 300 stores a valid MCIM and FIG. 1(c) shows a case where the second wireless communication apparatus 400 stores a valid MCIM. Also, as shown in FIGS. 1(b) and 1(c), it is possible for the first wireless communication apparatus 300 and the second wireless communication apparatus 400 to connect to the SHO 150 only when such apparatuses store a valid MCIM (blocks 301 and 402). Conversely, it is possible for a wireless communication apparatus that does not store a valid MCIM to connect to the RO 200 based on a Provisional Connectivity Identity (PCID) (e.g., in blocks 401 and 302).

Here, an MCIM is an example of contract authentication information, which may include, but is not limited to, telephone subscriber information and authentication key information. As one example, an MCIM is contract authentication information (e.g., a "soft Subscriber Identity Module (SIM)") that is not limited to a specified communication provider (e.g., a mobile telephone provider) when a device is purchased and can be flexibly set by a communication provider after purchase. Also, as examples, the expression "when a valid MCIM is not stored" refers to when an MCIM itself is not stored or when only MCIM that have been invalidated by an MCIM invalidation process is stored.

Also, PCID may represent an identifier (e.g., the terminal identification information 225 on a network shown in FIG. 4) for connecting to the RO and is assigned to every wireless communication apparatus or device.

In this way, when use rights over an MCIM are shared by a plurality of wireless communication apparatuses, it is possible to set the plurality of wireless communication apparatuses that participate in such sharing as a single group. An example of a group is shown in FIGS. 2(a) and 2(b).

b. Example of a Group Sharing an MCIM

FIGS. 2(a) and 2(b) illustrate exemplary groups in which an MCIM is shared by a plurality of wireless communication apparatuses, according to the first exemplary embodiment.

In FIG. 2(a), an example is shown where a third wireless communication apparatus 410 is added to a group AB (shown by the dotted rectangle 161) composed of the first wireless communication apparatus 300 and the second wireless communication apparatus 400. Note that the expression "group AB" is the name assigned to the group (for example, the "group name 221" shown in FIGS. 4(a) and 4(b)). As one example, the third wireless communication apparatus 410 is an information processing apparatus (for example, a notebook personal computer) equipped with a wireless communication function.

FIG. 2(b) shows a case where the third wireless communication apparatus 410 has been added to the group AB (shown by the dotted rectangle 161) shown in FIG. 2(a) so that the group AB becomes composed of three wireless communication apparatuses (shown by the dotted rectangle 162).

The user 10 is also capable of deleting a desired wireless communication apparatus, out of the three wireless communication apparatuses that compose the group AB (shown by the dotted rectangle 162) shown in FIG. 2(b), from the group AB.

Here, when a new wireless communication apparatus is additionally registered in a group, it is preferable for such addition operation to be carried out easily. In addition to facilitating such adding operation, it is also important to maintain security so that unintended wireless communication apparatuses are not added. It is therefore conceivable to carry out the addition operation using an ID and/or a password. However, if such ID and/or password were to become known by a third party, it would be difficult to maintain security for the addition operation. For this reason, in the first embodiment of the present disclosure, in addition to carrying out authentication that uses a group ID and password, both a wireless communication apparatus that has already been registered in a group and a new wireless communication apparatus to be added are used to additionally register the new wireless communication apparatus in the group.

c. Example Configuration of Communication System

FIG. 3 is a diagram of an exemplary configuration of a communication system (e.g., communications system 100), according to the first exemplary embodiment.

The communication system 100 includes a public network 110, base stations 121, 122, and 206, a network control apparatus 120, an information processing apparatus 200, the first wireless communication apparatus 300, the second wireless communication apparatus 400, and the third wireless communication apparatus 410.

The public network 110 is a public network such as a telephone network or the Internet. The public network 110 and the network control apparatus 120 are connected via a gateway (not shown). In the same way, the public network 110 and the information processing apparatus 200 are connected via a gateway (not shown).

The network control apparatus 120 is a communication control apparatus managed by a wireless communication provider that provides a wireless connection service and includes an authentication control unit (not shown). This authentication control unit carries out authentication control of wireless communication apparatuses connected via the base stations 121 and 122. Here, aside from special cases, the authentication control unit of the network control apparatus 120 authenticates a wireless communication apparatus storing a valid MCIM (contract authentication information) out of the wireless communication apparatuses connected via the base stations 121 and 122. The network control apparatus 120 also connects the authenticated wireless communication apparatus via the gateway (not shown) to the public network 110.

The network control apparatus 120 is also connected to the information processing apparatus 200 so as to exchange various information with the information processing apparatus 200. Here, a wireless communication apparatus that does not store a valid MCIM (contract authentication information) is capable of connecting (with a limited connection) via the network control apparatus 120 to the information processing apparatus 200 based on the PCID of the wireless communication apparatus.

The base stations 121, 122 are mobile communication base stations (e.g., NodeB) that connect the first wireless communication apparatus 300, the second wireless communication apparatus 400, and the third wireless communication apparatus 410, to the network control apparatus 120 via wireless connections 123 to 126.

As one example, in the communication system 100, the respective wireless communication apparatuses are connected via the wireless connections 123 to 126 to the base stations 121, 122 and are connected via the base stations 121, 122 to the network control apparatus 120. The respective wireless communication apparatuses are also connected via the network control apparatus 120 to the information processing apparatus 200. Note that the first wireless communication apparatus 300, the second wireless communication apparatus 400, and the third wireless communication apparatus 410 are respectively capable of connecting to any of the base stations 121, 122 in accordance with the locations at which such apparatuses are being used. Also, in the communication system 100, for a wireless communication apparatus storing a valid MCIM for a communication provider that operates the network control apparatus 120, the network control apparatus 120 and the base stations 121, 122 correspond to an SHO.

Also, a wireless communication apparatus that does not store a valid MCIM (contract authentication information) can connect (with a limited connection) via the wireless connection 207 and the base station 206 to the information processing apparatus 200 based on the PCID of the wireless communication apparatus. Also, in the communication system 100, for a wireless communication apparatus storing a valid MCIM of the communication provider that operates the network control apparatus 120, the information processing apparatus 200 and the base station 206 correspond to an RO. For this reason, in the embodiments of the present disclosure, the information processing apparatus 200 is sometimes referred to as the "RO 200".

The information processing apparatus 200 provides services such as initial connection and registration, and includes a communication unit 205, a control unit 210, and a group management database 220. Note that the information processing apparatus 200 is one example of an "information processing apparatus" and a "management system" referred to in the patent claims.

The communication unit 205 transmits and receives various information based on control by the control unit 210. The communication unit 205 is connected to the network control apparatus 120, for example, and transmits and receives various information to and from the respective wireless communication apparatuses connected via the network control apparatus 120. For example, the communication unit 205 receives a group addition request, which requests additional registration in a group stored in the group management database 220, from a wireless communication apparatus aside from the wireless communication apparatuses that compose such group. The communication unit 205 then outputs various information received from a wireless communication apparatus or the like to the control unit 210.

Note that the communication unit 205 is one example of a "receiving unit" referred to in the claims.

The control unit 210 carries out various control relating to the wireless communication apparatuses connected via the communication unit 205 and the network control apparatus 120. For example, the control unit 210 receives a group addition request from a wireless communication apparatus via the communication unit 205. In this way, when a group addition request has been received, the control unit 210 controls the additional registration in such group of the wireless communication apparatus that transmitted the group addition request. Such additional registration will be described in detail with reference to drawings such as FIGS. 10 to 13.

The group described above can be understood as a group that shares network connection rights. Such network connection rights are the right to connect to a specified network (for example, the public network 110) via a wireless connection and as one example correspond to use rights over an MCIM. That is, the network connection rights are rights for connecting to base stations operated by a communication provider based on an MCIM (i.e., an example of contract authentication information) for connecting to such base stations. For example, the presence or absence of such network connection rights can be decided according to the presence or absence of use rights over an MCIM.

The group management database 220 is a database for managing groups which are each composed of a plurality of wireless communication apparatuses sharing an MCIM. Note that although an example where the group management database 220 is provided inside the information processing apparatus 200 is shown in the first embodiment of the present disclosure, it is also possible for the group management database 220 to be provided outside the information processing apparatus 200 (that is, outside the RO 200). For example, it is possible to use a configuration where the (externally provided) group management database 220 and the information processing apparatus 200 are connected by a communication path such as a dedicated connection so that communication can be carried out between the group management database 220 and the control unit 210. As another example, it is possible to use a configuration where the (externally provided) group management database 220 and the information processing apparatus 200 are connected via the public network 110. Note that the group management database 220 will be described in detail with reference to FIGS. 4(a) to 5(b). The group management database 220 is one example of a "database" referred to in the patent claims.

Here, an example will be described where use rights over the MCIM are transferred (i.e., where the network connection rights are transferred) in the communication system 100. For example, the MCIM is stored in advance in the respective wireless communication apparatuses. Based on an instruction from the control unit 210, the network control apparatus 120 is capable of transferring the use rights over the MCIM by validating or invalidating the MCIM of the respective wireless communication apparatuses.

Instead of storing the MCIM in the respective wireless communication apparatuses, it is also possible to transfer use rights over the MCIM by transferring the MCIM itself. As one example, a case where use rights over the MCIM are transferred from the first wireless communication apparatus 300 to the second wireless communication apparatus 400 is imagined. For example, an MCIM transfer request is transmitted from the first wireless communication apparatus 300 to the control unit 210. In this case, based on an instruction from the control unit 210, the MCIM stored in the first wireless communication apparatus 300 is invalidated (deleted) by the network control apparatus 120. In addition, transfer information (setting information including the MCIM) is transmitted via the control unit 210 from the network control apparatus 120 to the second wireless communication apparatus 400. By storing the MCIM included in the transfer information in the second wireless communication apparatus 400, a valid MCIM is set in the second wireless communication apparatus 400.

d. Example Configuration of Group Management Database

FIGS. 4(a) to 5(b) are tables illustrating an exemplary structure of a group management database (e.g., group management database 220), according to the first exemplary embodiment. Note that in FIG. 4(a), a case where the first wireless communication apparatus 300 and the second wireless communication apparatus 400 are registered (fully registered) in the group AB is shown. Also, in FIG. 4(b) and FIG. 5(a), a case where the third wireless communication apparatus 410 is provisionally registered in the group AB shown in FIG. 4(a) is shown. In FIG. 5(b), a case where the third wireless communication apparatus 410 is fully registered in the group AB shown in FIGS. 4(b) and 5(a) is shown.

Here, the expression "provisional registration" in a group refers to a state where the wireless communication apparatus in question belongs to a group but has an approval state set at "unapproved." It is assumed here that a wireless communication apparatus that has been provisionally registered is not capable of transferring the use rights over an MCIM. Also, the expression "full registration" in a group (that is, proper registration) refers to a state where the wireless communication apparatus in question belongs to the group and has an approval state set at "approved." A wireless communication apparatus that has been fully registered in this way is capable of transferring use rights over the MCIM.

In the group management database 220, a group name 221, a group ID 222, a group password 223, a device name 224, terminal identification information 225, valid/invalid information 226, and an approval state 227 are stored so as to be associated with one another in group units. As one example, such information is successively updated by the control unit 210 based on information (group addition requests, approval information) from the respective wireless communication apparatuses.

A name assigned to a group is stored in the group name 221. Such name is stored for example when a group is generated.

An ID assigned to a group is stored in the group ID 222. A password assigned to a group is stored in the group password 223. A group addition request is made using such ID and password. The respective wireless communication apparatuses belonging to a group may store in advance the ID and password assigned to such group (for example, storage in a memory 340 shown in FIG. 6). Alternatively, an arrangement may be used where the ID and password are not stored in a wireless communication apparatus and are inputted each time by the user.

Names assigned to wireless communication apparatuses (devices) are stored in the device name 224. As one example, such names are stored when devices are additionally registered in a group.

Terminal identification numbers of wireless communication apparatuses are stored in the terminal identification information 225. Terminal identification information is identification information for identifying a wireless communication apparatus, and as one example a PCID is stored. In FIGS. 4(a) to 5(b), "PCID#1" in the terminal identification information 225 corresponds to the first wireless communication apparatus 300. In the same way, "PCID#2" in the terminal identification information 225 corresponds to the second wireless communication apparatus 400 and "PCID#3" in the terminal identification information 225 corresponds to the third wireless communication apparatus 410. Note that although an example where PCIDs are used as the terminal identification information 225 is shown here, it is also possible to use other identification information (for example, a serial number of a wireless communication apparatus) that is capable of identifying each wireless communication apparatus.

Information showing whether the MCIM at the wireless communication apparatus is valid or invalid (or an MCIM is yet to be stored) is stored in the valid/invalid information 226. Note that in FIGS. 4(a) to 5(b), for ease of explanation, a wireless communication apparatus where the MCIM is valid is shown as "valid" and a wireless communication apparatus where the MCIM is invalid is shown as "invalid".

In the approval state 227, information showing whether the approval state of a wireless communication apparatus belonging to the group is "approved" or "unapproved" is stored. Note that in FIGS. 4(a) to 5(b), for ease of explanation, a wireless communication apparatus whose approval state is approved is shown as "approved" and a wireless communication apparatus whose approval state is unapproved is shown as "unapproved". That is, when "approved" is stored in the approval state 227, this means that a wireless communication apparatus has been fully registered and when "unapproved" is stored in the approval state 227, this means that a wireless communication apparatus has been provisionally registered.

Also, for wireless communication apparatuses where "approved" is stored in the approval state 227, one of "valid" and "invalid" is stored in the valid/invalid information 226. Meanwhile, for wireless communication apparatuses where "unapproved" is stored in the approval state 227, "-" is stored in the valid/invalid information 226. That is, for the wireless communication apparatuses in the fully registered state, it is possible to transfer the use rights over the MCIM, and therefore one of "valid" and "invalid" is stored in the valid/invalid information 226 in accordance with whether such wireless communication apparatus stores use rights over the MCIM. Meanwhile, for the wireless communication apparatuses in the provisionally registered state, it is not possible to transfer the use rights over the MCIM, and therefore "-" is stored in the valid/invalid information 226.

e. Example Configuration of Wireless Communication Apparatus

FIG. 6 is a diagram of an exemplary configuration of a wireless communication apparatus (e.g., first wireless communication apparatus 300), according to the first exemplary embodiment. Note that since the internal configurations of the second wireless communication apparatus 400 and the third wireless communication apparatus 410 are the same as that of the first wireless communication apparatus 300, description thereof is omitted here. Also, in FIG. 6 onwards, when describing the second wireless communication apparatus 400 or the third wireless communication apparatus 410, names and reference numerals corresponding to the first wireless communication apparatus 300 are used.

The first wireless communication apparatus 300 includes an antenna 311, an antenna sharing unit 312, a modulating unit 321, a demodulating unit 322, a control unit 330, a memory 340, and the MCIM information storage unit 350. The first wireless communication apparatus 300 also includes an operation unit 360, a display unit 370, a location information acquiring unit 380, a microphone 391, and a speaker 392. Such components are connected by a bus 331. As one example, the first wireless communication apparatus 300 is realized by a mobile telephone apparatus capable of telephone calls and data communication.

For example, when a reception process is carried out, radio waves received by the antenna 311 are demodulated via the antenna sharing unit 312 by the demodulating unit 322 and demodulated reception data is supplied to the control unit 330. When the reception process is an incoming call process, the demodulated reception data (audio data) is outputted via the control unit 330 from the speaker 392 as sound.

When, for example, a transmission process is carried out, the transmission data outputted by the control unit 330 is modulated by the modulating unit 321 and the modulated transmission data is transmitted via the antenna sharing unit 312 from the antenna 311. When the transmission process is an outgoing call process, audio data inputted from the microphone 391 is modulated via the control unit 330 by the modulating unit 321 and modulated transmission data (audio data) is transmitted via the antenna sharing unit 312 from the antenna 311.

The control unit 330 carries out various control based on a control program stored in the memory 340. As one example, the control unit 330 is constructed of a microprocessor. For example, the control unit 330 is connected to the modulating unit 321 and the demodulating unit 322 and transmits and receives various data to and from the network control apparatus 120 connected via the base stations 121, 122. The control unit 330 also carries out a connection process that connects to the RO 200 (with a limited connection) via a wireless connection based on the PCID, for example, without using the MCIM.

The memory 340 is a memory storing a control program for enabling the control unit 330 to carry out various control, in addition to transmission data, reception data, and the like. As examples, the memory 340 is constructed of ROM (Read Only Memory) and/or RAM (Random Access Memory). Terminal identification information (PCID#1) for specifying the first wireless communication apparatus 300 and a device name (for example, the device name 224 shown in FIGS. 4(a) to 5(b)) of the first wireless communication apparatus 300 are also stored in the memory 340. Such device name is registered for example by a user operation. The ID and password assigned to the group AB to which the first wireless communication apparatus 300 belongs (as one example, the group ID 222 and the group password 223 shown in FIGS. 4(a) to 5(b)) are also stored in the memory 340. As one example, such group ID and password are included in approval state information (see FIG. 11), are transmitted from the information processing apparatus 200, and are recorded in the memory 340.

The MCIM information storage unit 350 is a memory storing an MCIM (contract authentication information). As the MCIM information storage unit 350, as examples it is possible to use a UICC (Universal Integrated Circuit) card or a dedicated memory for securely storing an MCIM. Note that when a UICC card is used as the MCIM information storage unit 350, instead of the MCIM being permanently written, a card capable of a validation process and an invalidation process for the MCIM is used. That is, a device that enables the control unit 330 to carry out a validation process and an invalidation process for an MCIM based on transfer information that has been received from the antenna 311 and demodulated is used. Also, a device that allows the MCIM to be rewritten is used. Note that the validation process and invalidation process for the MCIM can be carried out according to the validation process and invalidation process defined by 3GPP (Third Generation Partnership Project). Also, by providing a secure region in the memory 340, the MCIM information storage unit 350 may be provided inside the memory 340.

Here, when an operation input for additional registration in a group has been received by the operation unit 360, the control unit 330 carries out control to transmit a group addition request via a wireless connection to the RO 200. As one example, such group addition request requests additional registration in the group of a wireless communication apparatus aside from the wireless communication apparatuses that compose such group and includes group information (for example, an ID and password of a group) stored in the memory 340. A group addition request requests provisional registration in a group until an approval operation is carried out by a wireless communication apparatus composing the group and requests additional registration in the group subject to a condition that such an approval operation will be carried out.

When a group addition request has been received, the control unit 210 of the RO 200 carries out a provisional registration process that provisionally registers the wireless communication apparatus that transmitted the group addition request in the group related to the group addition request. When, after provisional registration, an approval operation has been carried out for the group addition request at a wireless communication apparatus that composes the group, the control unit 210 of the RO 200 carries out a registration process that additionally registers the wireless communication apparatus that transmitted the group addition request in the group. Note that the registration process and the provisional registration process are carried out by the control unit 210 of the RO 200 updating the content of the group management database 220.

The control unit 210 of the RO 200 also carries out a transfer process that transfers the use rights over the MCIM between the plurality of wireless communication apparatuses that compose a group in accordance with a request from a wireless communication apparatus composing the group. When such transfer process has been carried out, the control unit 210 of the RO 200 updates the content of the group management database 220. Here, the control unit 210 of the RO 200 does not transfer the use rights over the MCIM to a wireless communication apparatus that has been provisionally registered in the group.

Also, when for example an operation input for deleting any of the wireless communication apparatuses that compose a group from such group has been received, the control unit 330 transmits a group deletion request for deletion of the wireless communication apparatus to be deleted from the group to the RO 200. The control unit 210 of the RO 200 then carries out a deletion process for deleting the wireless communication apparatus to be deleted from the group.

The operation unit 360 is an operation receiving unit receiving an operation input made by the user and outputs a signal in accordance with the received operation input to the control unit 330. The operation unit 360 includes various keys such as numeric keys and/or alphabet keys and receives an instruction operation (or "specified operation") made by the user who designates a group addition request. Note that the operation unit 360 is an example of the receiving unit described in the scope of claims.

The display unit 370 is a display unit that displays various information (text information, time information, and the like) based on control by the control unit 330. As one example, the display unit 370 displays various information (for example, the display screens shown in FIGS. 7 to 9) relating to a group addition registration. Note that as examples, it is possible to use a display panel such as an organic EL (Electro Luminescence) panel or an LCD (Liquid Crystal Display) panel. It is also possible to integrally construct the operation unit 360 and the display unit 370 using a touch panel that enables the user to make an operation input by touching or placing his/her finger close to a display screen.

The location information acquiring unit 380 acquires location information showing the location where the first wireless communication apparatus 300 is present and outputs the acquired location information to the control unit 330. As one example, the location information acquiring unit 380 can be realized by a GPS (Global Positioning System) unit that calculates the location information using GPS signals received by a GPS signal reception antenna (not shown). The calculated location information includes various data relating to location, such as latitude, longitude, and altitude, at the time the GPS signals were received. It is also possible to use a location information acquiring apparatus acquiring location information according to a different method of acquiring location information. For example, it is possible to derive location information using access point information according to a wireless LAN (Local Area Network) present in the periphery and to use a location information acquiring apparatus that acquires such location information.

f. Example Displays of Addition Operation Screen and Confirmation Operation Screen FIGS. 7(a) and 7(b) illustrate exemplary display screens displayed on display units of a wireless communication apparatus (e.g., first wireless communication apparatus 300 and the third wireless communication apparatus 410), according to the first exemplary embodiment. More specifically, FIG. 7(a) shows an example of a display screen displayed on the display unit 370 of the third wireless communication apparatus 410 and FIG. 7(b) shows an example of a display screen displayed on the display unit 370 of the first wireless communication apparatus 300.

FIG. 7(a) shows an addition operation screen 500 for carrying out an addition operation for adding the third wireless communication apparatus 410 to a group. The addition operation screen 500 includes a group ID input region 501, a group password input region 502, a confirm button 503, and a return button 504.

The group ID input region 501 is a region for inputting the ID of the group to which the third wireless communication apparatus 410 is to be added.

The group password input region 502 is a region for inputting a password of the group to which the third wireless communication apparatus 410 is to be added. That is, the ID of the group AB is inputted into the group ID input region 501 and the password of the group AB is inputted into the group password input region 502. Note that since the password is not displayed on the actual screen for security purposes, the password is shown as "******" in FIGS. 7(a) and 7(b).

The confirm button 503 is a button that is pressed after the various operations described above (input operation) have been carried out and is used to confirm the content of such operations.

The return button 504 is a button pressed when returning to a display screen that was displayed immediately before the addition operation screen 500, for example. Note that since the return buttons 515 and the like shown in drawings such as FIG. 8 are substantially the same, description of such buttons is omitted for such drawings.

FIG. 7(b) shows a confirmation operation screen 505 for carrying out a DB confirmation operation that requests information (DB confirmation information) for fully registering a wireless communication apparatus (the third wireless communication apparatus 410) aside from the first wireless communication apparatus 300 in the group AB. Note that since the group registration screen 500 and the confirmation operation screen 505 are substantially the same aside from the messages displayed at the top, only the differences with the group registration screen 500 are described here and other description is omitted.

The group ID input region 501 is a region for inputting the ID of the group to which the first wireless communication apparatus 300 belong.

The group password input region 502 is a region for inputting a password of the group to which the first wireless communication apparatus 300 belong.

Note that although only the addition operation screen displayed on the third wireless communication apparatus 410 and the confirmation operation screen 505 displayed on the first wireless communication apparatus 300 is shown in FIG. 7(b), it is assumed that each screen displayed on other wireless communication apparatuses is substantially the same.

g. Example Display of an Approval Operation Screen

FIG. 8 illustrates an exemplary display screen on a display unit of a wireless communications apparatus (e.g., first wireless communication apparatus 300), according to the first exemplary embodiment. The approval operation screen 510 shown in FIG. 8 is a screen for confirming the group (group AB) to which the first wireless communication apparatus 300 belongs. More specifically, the approval operation screen 510 is a screen for displaying the content of the group management database 220 (for example, a list of wireless communication apparatuses belonging to the group AB) and for carrying out an approval operation for wireless communication apparatuses that have been provisionally registered in such group.

The approval operation screen 510 includes a device name display region 511, an approval state display region 512, an approve button 513, a confirm button 514, and a return button 515.

The device name display region 511 is a region displaying names and the like (in FIG. 8, device names and the terminal identification information) of the respective wireless communication apparatuses registered (fully registered or provisionally registered) in the group AB to which the first wireless communication apparatus 300 belongs.

The approval state display region 512 is a display region displaying the approval states of the respective wireless communication apparatuses registered (fully registered or provisionally registered) in the group AB to which the first wireless communication apparatus 300 belongs. More specifically, "approved" is displayed for wireless communication apparatuses that have been fully registered in the group AB and "unapproved" is displayed for wireless communication apparatuses that have been provisionally registered in the group AB.

The approve button 513 is a button pressed when giving approval to fully register a wireless communication apparatus provisionally registered in the group AB. When a plurality of wireless communication apparatuses are provisionally registered, an approve button 513 is provided for each of such wireless communication apparatuses. Note that when a plurality of wireless communication apparatuses are provisionally registered, check boxes may be displayed for each of such wireless communication apparatuses so that the wireless communication apparatuses to be approved can be selected using the check boxes.

In this way, FIG. 8 shows an example where the approval operation screen 510 is displayed based on the content of the group management database 220 shown in FIG. 4(b).

The confirm button 514 is a button pressed when confirming the operation content after making the operation (a pressing operation of the approve button 513) described above. Note that it is possible to use an arrangement where the confirm button 514 can be operated only when a pressing operation of the approve button 513 has been made, and where the confirm button 514 is grayed out when a pressing operation of the approve button 513 has not been made.

h. Example Display of Registration Result Notification

FIGS. 9(a) and 9(b) illustrate an exemplary display screen displayed on a display unit of a wireless communications apparatus (e.g., first wireless communication apparatus 300), according to the first exemplary embodiment. The display screens 520 and 525 shown in FIGS. 9(a) and 9(b) are screens notifying the user of the registration result when an addition operation for adding the third wireless communication apparatus 410 to the group AB has been made. More specifically, FIG. 9(a) shows a registration result notification screen 520 displaying a message showing that registration was carried out for an addition operation and FIG. 9(b) shows a registration result notification screen 525 displaying a message showing that registration was not carried out for an addition operation.

The registration result notification screen 520 shown in FIG. 9(a) displays a message showing that additional registration (full registration) has been carried out and is additionally provided with a device display region 521 showing the device with a valid MCIM, a button 522 for switching to an MCIM transfer operation screen, and a confirm button 523.

The device display region 521 showing the device with a valid MCIM is a region displaying information (device information) relating to a wireless communication apparatus with a valid MCIM out of the wireless communication apparatuses that belong to the group subjected to additional registration. For example, the content of the group management database 220 is included in the approval state information (shown in FIG. 11, for example) and the device information is displayed based on such content.

The button 522 for switching to an MCIM transfer operation screen is a button which is pressed when switching to a display screen for carrying out an operation for transferring the MCIM between wireless communication apparatuses that belong to the group subjected to the additional registration.

The confirm button 523 is a button pressed by the user after confirming the additional registration in the group and confirming the wireless communication apparatuses with the valid MCIM. When the confirm button 523 has been pressed, a specified display screen (for example, an initial screen) is displayed.

The registration result notification screen 525 shown in FIG. 9(b) displays a message showing that registration of the group addition failed and is additionally provided with a button 526 for switching to an addition operation screen and a confirm button 527.

The button 526 for switching to an addition operation screen is a button pressed when switching to a display screen (for example, the addition operation screen 500 shown in FIG. 7(a)) for repeating an addition operation for adding the wireless communication apparatus, for which registration of the group addition failed, to the group AB.

The confirm button 527 is a button pressed by the user after confirming that registration of the group addition failed. When the confirm button 527 has been pressed, a specified display screen (for example, an initial screen) is displayed.

Note that although only the registration result notification screen 520 and 525 displayed on the third wireless communication apparatus 410 are shown in FIGS. 9(a) and 9(b), it is assume that the display screens displayed on other wireless communication apparatuses are substantially the same.

In this way, when a notification, which shows that additional registration in a group has been carried out in accordance with a group addition request, has been received from the RO 200, the control unit 330 carries out control to display a message showing that additional registration in such group has been carried out on the display unit 370.

i. Example of Communication when Carrying Out Additional Registration Using a Plurality of Wireless Communication Apparatuses FIGS. 10 and 11 are flowcharts of an exemplary communication process carried out between the apparatuses of a communications system (e.g., communication system 100), according to the first exemplary embodiment.

In FIGS. 10 and 11, an imaginary case is explained where the group AB is composed of the first wireless communication apparatus 300 and the second wireless communication apparatus 400 and the first wireless communication apparatus 300 is storing a valid MCIM. Also, in FIGS. 10 and 11, an example of a communication process when additionally registering (i.e., fully registering) the third wireless communication apparatus 410 in the group AB by operating the first wireless communication apparatus 300 and the third wireless communication apparatus 410 that is yet to subscribe to the group AB is shown. Here, an example is described where group addition requests are made by first operating the third wireless communication apparatus 410 and then operating the first wireless communication apparatus 300. Note that in FIGS. 10 and 11, it is assumed that the first wireless communication apparatus 300 is connected to the SHO 150 (step 601) and that the second wireless communication apparatus 400 and the third wireless communication apparatus 410 are connected to the RO 200 (steps 602 and 603).

First, a display screen for adding the third wireless communication apparatus 410 to the group AB is displayed on the display unit 370 of the third wireless communication apparatus 410. As one example, based on a user operation, the addition operation screen 500 shown in FIG. 7(a) (except that the respective input regions are blank) is displayed. Next, in the addition operation screen 500, the ID and the password of the group AB are inputted into the group ID input region 501 and the group password input region 502 (step 604). The ID and password of the group AB are one example of group information relating to the group AB. After such input operations have been carried out, the confirm button 503 is pressed (step 604).

In this case, when an addition operation for the group AB has been received (604), a group addition request corresponding to such addition operation is transmitted from the third wireless communication apparatus 410 to the RO 200 (steps 605 and 606). As described above, since the third wireless communication apparatus 410 is connected to the RO 200 (step 603), the group addition request is transmitted directly from the third wireless communication apparatus 410 to the RO 200 (steps 605 and 606).

A group addition request includes various information inputted into the addition operation screen 500 and identification information (the terminal identification information (PCID#3) stored in the memory 340) of the wireless communication apparatus that made the group addition request. As examples, the various information inputted into the addition operation screen 500 is the ID and password of the group and passcode.

When the RO 200 receives the group addition request (606), the control unit 210 of the RO 200 carries out the authentication process for the received group addition requests based on the content of the group management database 220 (607). More specifically, it is determined whether the ID and password of the group included in the received group addition requests match the ID and password of a group stored in the group management database 220. If a group whose ID and password match is present, the control unit 210 authenticates the provisional registration of the third wireless communication apparatus 410 related to the received group addition requests.

If the authentication according to the authentication process relating to the received group addition requests succeeds (step 607), the control unit 210 updates the content of the group management database 220 (step 608). That is, in the group management database 220, the third wireless communication apparatus 410 is provisionally registered in the group AB (i.e., updating from the state shown in FIG. 4(a) to the state shown in FIG. 4(b) (e.g., the dotted rectangle 228).

In this way, when the third wireless communication apparatus 410 has been provisionally registered in the group AB (step 608), the third wireless communication apparatus 410 is fully registered in the group AB on condition that an approval operation has been carried out at another wireless communication apparatus that is fully registered in the group AB.

Here, a case is imagined where authentication has failed in an authentication process relating to the received group addition request (step 607). In this case, the content of the group management database 220 is not updated and a notification (registration result notification) showing that additional registration in the group relating to the group addition request was not possible is transmitted to the third wireless communication apparatus 410. After this, a registration result notification screen (for example, the registration result notification screen 525 shown in FIG. 9(b)) showing such result is displayed on the third wireless communication apparatus 410. Here, one example of a case where authentication fails is a case where at least one of the ID and password of the group included in the received group addition request does not match the content of the group management database 220.

After the third wireless communication apparatus 410 has been provisionally registered in the group AB (step 608), a DB confirmation operation that requests information (DB confirmation information) for fully registering the third wireless communication apparatus 410 in the group AB is carried out at the first wireless communication apparatus 300 (step 609). As one example, based on a user operation, the confirmation operation screen 505 shown in FIG. 7(b) (except that the respective input regions are blank) is displayed. In the confirmation operation screen 505, the ID and password of the group AB are then respectively inputted into the group ID input region 501 and the group password input region 502 (step 609). After such input operations have been carried out, the confirm button 503 is pressed (step 609).

When such a DB confirmation operation has been received (609), a DB confirmation request is transmitted from the first wireless communication apparatus 300 to the RO 200 (steps 610 to 613). As described earlier, since the first wireless communication apparatus 300 is connected to the SHO 150 (step 601), the DB confirmation request is transmitted from the first wireless communication apparatus 300 to the RO 200 via the SHO 150 (steps 610 to 613).

Here, the DB confirmation request includes various information inputted into the confirmation operation screen 505 and identification information (the terminal identification information (PCID#1) stored in the memory 340) of the wireless communication apparatus making the DB confirmation request. The various information inputted into the confirmation operation screen 505 is for example the ID and password of the group.

Note that the ID and password of the group AB are stored in the memory 340 of the first wireless communication apparatus 300. This means that by using the ID and password of the group AB stored in the memory 340, it is possible to omit the operation inputs into the group ID input region 501 and the group password input region 502. That is, the content (the ID and password assigned to the group AB) stored in the memory 340 of the first wireless communication apparatus 300 are displayed in the group ID input region 501 and the group password input region 502 of the confirm operation screen 505. By doing so, it becomes unnecessary for the user to input the ID and password of the group AB and the user can instead simply confirm the displayed content for such information.

When a DB confirmation request is received (step 613), the control unit 210 of the RO 200 carries out an authentication process for the received DB confirmation request based on the content of the group management database 220 (step 614). More specifically, it is determined whether the ID and password of the group included in the received DB confirmation request match the ID and password of a group stored in the group management database 220. If a group whose ID and password respectively match is present, the control unit 210 transmits information (DB confirmation information) relating to the matching group to the first wireless communication apparatus 300 that transmitted the DB confirmation request (steps 615 to 618). In this case also, the DB confirmation information is transmitted from the RO 200 to the first wireless communication apparatus 300 via the SHO 150 (steps 615 to 618).

When the first wireless communication apparatus 300 has received the DB confirmation information (step 618), an approval operation screen for giving group addition approval is displayed on the display unit 370 of the first wireless communication apparatus 300 (step 619). As one example, the approval operation screen 510 shown in FIG. 8 is displayed. Next, in the approval operation screen 510, a user who has confirmed the display content of the device name display region 511 and the approval state display region 512 presses the approve button 513 and then presses the confirm button 514 (step 620). That is, after confirming the wireless communication apparatus that is provisionally registered, an approval operation for approving such wireless communication apparatus is carried out.

In this way, at a wireless communication apparatus (the first wireless communication apparatus 300) fully registered in the group AB, it is possible to display a list of wireless communication apparatuses registered (fully registered or provisionally registered) in the group AB. After this, it is possible to carry out an approval operation by merely selecting the wireless communication apparatus to be approved (e.g., the third wireless communication apparatus 410) from the list.

When an approval operation has been carried out in this way after confirming the wireless communication apparatus that is provisionally registered (620), approval information (a message showing device approval) for approving the group addition request is transmitted from the first wireless communication apparatus 300 to the RO 200 (steps 621 to 624). In this case also, since the first wireless communication apparatus 300 is connected to the SHO 150 (step 601), the approval information is transmitted from the first wireless communication apparatus 300 to the RO 200 via the SHO 150 (steps 621 to 624).

When the approval information showing the group addition request has been approved has been received (step 624), the control unit 210 of the RO 200 updates the content of the group management database 220 (step 625). That is, in the group management database 220, the third wireless communication apparatus 410 is additionally registered (fully registered) in the group AB (i.e., updating from the state shown in FIG. 5(a) to the state shown in FIG. 5(b) (e.g., the dotted rectangles 228, 229)). In this way, by changing the third wireless communication apparatus 410 from being provisionally registered to being fully registered, it becomes possible to transfer the use rights over the MCIM relating to the group AB to the third wireless communication apparatus 410.

Also, at the third wireless communication apparatus 410, an approval state confirmation operation that requests information (approval state information) for confirming the approval state of the additional registration (full registration) in the group AB is carried out (step 626). For example, based on a user operation, a confirmation operation screen is displayed. As one example, this confirmation operation screen is a confirmation operation screen where only the message at the top differs to the confirmation operation screen 505 shown in FIG. 7(b) (except that the respective input regions are also blank). For this reason, the description here uses the same reference numerals as FIG. 7(b). In this confirmation operation screen, the ID and password of the group AB are respectively inputted into the group ID input region 501 and the group password input region 502 (step 626). After such input operations have been carried out, the confirm button 503 is pressed (step 626).

When such approval state confirmation operation has been received (626), an approval state confirmation request is transmitted from the third wireless communication apparatus 410 to the RO 200 (steps 627 and 628). In this case also, the approval state confirmation request is transmitted directly from the third wireless communication apparatus 410 to the RO 200 (steps 627 and 628).

Here, the approval state confirmation request includes various information inputted into the confirmation operation screen and identification information (the terminal identification information (PCID#3) stored in the memory 340) of the wireless communication apparatus that is making the approval state confirmation request. The various information inputted into the confirmation operation screen is for example the ID and password of the group.

When the approval state confirmation request has been received (628), the control unit 210 of the RO 200 carries out an approval process for the received approval state confirmation request based on the content of the group management database 220 (step 629). More specifically, it is determined whether the ID and password of the group included in the received approval state confirmation request match an ID and password stored in the group management database 220. If a group whose ID and password respectively match is present, the control unit 210 transmits information (approval state information) showing the registered content (provisional registration, full registration) of the matching group to the third wireless communication apparatus 410 (steps 630 and 631). In this case, the approval state information is directly transmitted from the RO 200 to the third wireless communication apparatus 410 (steps 630 and 631).

When the third wireless communication apparatus 410 has received the approval state information (step 631), the approval state information is displayed on the display unit 370 of the third wireless communication apparatus 410 (step 632). As one example, a registration result notification screen for giving notification of the registration result for a group addition request (the registration result notification screen 520 shown in FIG. 9(a)) is displayed as the approval state information.

j. Example of Communication when Addition Approval is Given by a Wireless Communication Apparatus not Storing a Valid MCIM FIGS. 12 and 13 are flowcharts of an exemplary communication process carried out between the various apparatuses of a communications system (e.g., communication system 100), according to the first exemplary embodiment. Note that since the sequence charts shown in FIGS. 12 and 13 are a modification to FIGS. 10 and 11, parts that are the same as FIGS. 10 and 11 have been assigned the same reference numerals and the description thereof is partially omitted. Also, FIGS. 12 and 13 show an example where group addition approval is given by the second wireless communication apparatus 400 that does not store a valid MCIM. In this way, the second wireless communication apparatus 400 that does not store a valid MCIM is capable of connecting to the RO 200 with only a limited connection based on a PCID.

The processes (steps 641 to 659) shown in FIGS. 12 and 13 correspond to the processes (steps 609 to 625) shown in FIGS. 10 and 11. However, as described earlier, the second wireless communication apparatus 400 is connected to the RO 200 (602). For this reason, the exchanging of information between the second wireless communication apparatus 400 and the RO 200 is carried out directly between the RO 200 and the second wireless communication apparatus 400 without passing the SHO 150.

In this way, according to the first embodiment of the present disclosure, as one example the contact authentication information (MCIM) of the public network 110 can be easily shared by a plurality of wireless communication apparatuses in a group. In such case, when a new wireless communication apparatus is additionally registered in a group, it is possible to reliably add the wireless communication apparatus while maintaining security.

For example, by carrying out an addition operation at the third wireless communication apparatus 410, it is possible to add the third wireless communication apparatus 410 to the group AB. In such case, since the third wireless communication apparatus 410 is additionally registered (fully registered) in the group AB after such addition has been approved by another wireless communication apparatus belonging to the group AB, it is possible to prevent unintended wireless communication apparatuses from being added to the group AB. By doing so, it is possible to increase security and reliably add a wireless communication apparatus. It is also possible to carry out the approval operation at another wireless communication apparatus belonging to the group AB at timing that is convenient for the user. By doing so, even in a case where the ID and/or password of the group AB has/have been lost or the ID and/or password has/have leaked out to a third party, it will still be possible to prevent unexpected additions to the group AB by a third party. That is, according to the first embodiment of the present disclosure, it is possible to easily share the right to connect to a network between a plurality of wireless communication apparatuses. In such case, it is possible to maintain security over the sharing.

Note that in the first embodiment of the present disclosure, an example is described where a wireless communication apparatus that has been provisionally registered in a group is fully registered when approval is given by one wireless communication apparatus fully registered in the group. However, it is also possible to fully register a wireless communication apparatus that has been provisionally registered in a group only when approval is given by a plurality of wireless communication apparatuses fully registered in the group. For example, when a single group is composed of a plurality of people, it is possible to set the approval of all or a specified proportion (for example, 80%) of the members of the group as a condition for full registration. Also, when a group is composed of the staff of a company, it is possible to set approval by certain staff members (for example, a department head and a section head) as a condition for full registration Here, in FIGS. 10 to 13, an example where the provisionally registered wireless communication apparatus is stored in the group management database 220 until full registration is carried out is shown. However, a case can also be imagined where a user who has carried out an addition operation for a group at a wireless communication apparatus for which additional registration is desired then forgets to carry out the approval operation. If, in this way, the number of wireless communication apparatuses for which an approval operation has not been carried out after provisional registration increases, the storage volume of the group management database 220 would become large and the load of the information processing apparatus 200 would increase. For this reason, as one example, it is possible to delete the provisional registration of a wireless communication apparatus (that is, a wireless communication apparatus in the provisionally registered state) if an approval operation has not been made for such wireless communication apparatus before a certain period (for example, 24 hours) elapses from the start of provisional registration. By deleting provisional registrations in this way, it is possible to operate the group management database 220 even more efficiently. Note that the value (certain period) used as a standard when deleting provisional registrations may change in accordance with a user operation, the number of provisionally registered wireless communication apparatuses, or the like.

That is, if an approval operation has not been carried out for a time equal to or longer than a certain period from the provisional registration, the control unit 210 of the RO 200 carries out control to delete the provisional registration and does not carry out additional registration relating to such provisional registration.

k. Example Operation of Communication System

Next, the operation of the communication system 100 according to the first embodiment of the present disclosure will be described with reference to the drawings.

l. Example Operation of Wireless Communication Apparatus

FIG. 14 is a flowchart of an exemplary communication process performed by a wireless communications apparatus (e.g., first wireless communication apparatus 410), according to the first exemplary embodiment. In FIG. 14, the case where the third wireless communication apparatus 410 that does not store a valid MCIM makes a group addition request will be described as one example. Note that although only the example operation of the first wireless communication apparatus 300 is shown in FIG. 14, it is also possible to apply such operation to other wireless communication apparatuses.

First, the control unit 330 judges whether an addition operation for a group sharing an MCIM has been carried out (step S901) and when such addition operation has not been carried out, such monitoring is continued. When such addition operation has been carried out (step S901), the control unit 330 displays a display screen (for example, the addition operation screen 500 shown in FIG. 7(a)) for carrying out an addition operation for the group sharing the MCIM on the display unit 370 (step S902).

Next, the control unit 330 determines whether a pressing operation has been carried out for the return button in such display screen (for example, a pressing operation for the return button 504 in the addition operation screen 500 shown in FIG. 7(a)) (step S903). If such button operation has been carried out (step S903), the processing returns to step S901.

When such pressing operation has not been carried out (step S903), the control unit 330 determines whether a transmission operation for a group addition request has been carried out in the display screen (step S904). This transmission operation is for example a pressing operation of the confirm button 503 after operating the items in the addition operation screen 500 shown in FIG. 7(a). When such transmission operation has not been carried out (step S904), the processing returns to step S903.

When a transmission operation for a group addition request (i.e., an addition operation) has been carried out (step S904), the control unit 330 transmits a group addition request corresponding to the addition operation to the RO 200 (step S905). In this case, since the third wireless communication apparatus 410 is not storing a valid MCIM, the group addition request is transmitted from the third wireless communication apparatus 410 directly to the RO 200. Note that step S904 is an example of the "receiving" process referred to in the patent claims. Also, step S905 is an example of the "transmitting" process referred to in the patent claims.

After this, the control unit 330 determines whether an approval state confirmation operation that requests information (approval state information) for confirming the approval state of the additional registration (full registration) in a group has been carried out (step S906), and if such approval state confirmation operation has not been carried out, such monitoring is continued. If an approval state confirmation operation has been carried out (step S906), the control unit 330 displays a display screen (for example, the confirmation operation screen 505 shown in FIG. 7(b)) for requesting the approval state information on the display unit 370 (step S907).

Next, the control unit 330 determines whether a pressing operation has been carried out for the return button in such display screen (for example, a pressing operation for the return button 504 in the confirm operation screen 505 shown in FIG. 7(b)) (step S908). If such button operation has been carried out (step S908), the processing returns to step S906.

When such pressing operation has not been carried out (step S908), the control unit 330 determines whether a transmission operation for a approval state confirmation request has been carried out in the display screen (step S909). This transmission operation is for example a pressing operation of the confirm button 503 after operating the items in the confirm operation screen 505 shown in FIG. 7(*b*). When such transmission operation has not been carried out (step S909), the processing returns to step S908.

If a transmission operation for an approval state confirmation request has been carried out (step S909), the control unit 330 transmits an approval state confirmation request corresponding to such transmission operation to the RO 200 (step S910). In this case, since the third wireless communication apparatus 410 does not store a valid MCIM, the approval state transmission request is transmitted directly from the third wireless communication apparatus 410 to the RO 200.

Next, it is determined whether information (approval state information) showing the registered content (provisional registration, full registration) of the group relating to the group addition request has been received (step S911) and when the approval state information has not been received, such monitoring is continued. On the other hand, when the approval state information has been received (step S911), the control unit 330 displays an approval state information screen on the display unit 370 (step S912). For example, if approval state information showing that group additional registration (full registration) has been carried out (step S911), the control unit 330 displays a message showing this result (for example, the registration result notification screen 520 shown in FIG. 9(*a*)) on the display unit 370 (step S912). Meanwhile, if approval state information showing that group additional registration has not been carried out (step S911), the control unit 330 displays a message showing such result (for example, the registration result notification screen 525 shown in FIG. 9(*b*)) on the display unit 370 (step S912).

FIG. 15 is a flowchart of an exemplary communication process performed by a wireless communications apparatus (e.g., first wireless communication apparatus 300), according to the first exemplary embodiment. In FIG. 15, the case where the first wireless communication apparatus 300 with a valid MCIM is used for an approval operation will be described as one example. Note that although only the example operation of the first wireless communication apparatus 300 is shown in FIG. 15, it is also possible to apply such operation to other wireless communication apparatuses.

First, the control unit 330 judges whether an DB confirm operation for requesting DB confirm information for fully registering a new wireless communication apparatus to a group sharing MCIM has been carried out (step S921) and when such DB confirm operation has not been carried out, such monitoring is continued. When such request operation has been carried out (step S921), the control unit 330 displays a display screen (for example, the confirm operation screen 505 shown in FIG. 7(*b*)) for carrying out an request operation for requesting the DB confirm information on the display unit 370 (step S922).

Next, the control unit 330 determines whether a pressing operation has been carried out for the return button in such display screen (for example, a pressing operation for the return button 504 in the confirm operation screen 505 shown in FIG. 7(*b*)) (step S923). If such button operation has been carried out (step S923), the processing returns to step S921.

When such pressing operation has not been carried out (step S923), the control unit 330 determines whether a transmission operation for a DB confirm request requesting for DB confirm information has been carried out in the display screen (step S924). This transmission operation is for example a pressing operation of the confirm button 503 after operating the items in the confirm operation screen 505 shown in FIG. 7(*b*). When such transmission operation has not been carried out (step S924), the processing returns to step S923.

When a transmission operation for a DB confirm request for a DB confirm request, has been carried out (step S924), the control unit 330 transmits a DB confirm request corresponding to the transmission operation to the RO 200 (step S925). In this case, since the first wireless communication apparatus 300 is storing a valid MCIM, the DB confirm request is transmitted from the first wireless communication apparatus 300 via the SHO 150 to the RO 200.

Next, the control unit 330 judges whether the DB confirm information related to groups corresponding to the DB confirm request (step S926), when the DB confirm information has not been received, such monitoring is continued. When the DB confirm information has been received (step S926), the control unit 330 displays a display screen (for example, the approval operation screen 510 shown in FIG. 8) for carrying out a group addition approval on the display unit 370 (step S927).

Next, the control unit 330 determines whether a pressing operation has been carried out for the return button in such display screen (for example, a pressing operation for the return button 515 in the approval operation screen 510 shown in FIG. 8) (step S928). If such button operation has been carried out (step S928), the processing returns to step S921.

When such pressing operation has not been carried out (step S928), the control unit 330 determines whether a transmission operation for a approval information has been carried out in the display screen (step S929). This transmission operation is for example a pressing operation of the confirm button 514 after pressing the approval button 513 in the approval operation screen 510 shown in FIG. 8. When such transmission operation has not been carried out (step S929), the processing returns to step S928.

When a transmission operation for an approval information has been carried out (step S929), the control unit 330 transmits the approval information corresponding to the transmission operation to the RO 200 (step S930). In this case, since the first wireless communication apparatus 300 is storing a valid MCIM, the approval information is transmitted from the first wireless communication apparatus 300 via the SHO 150 to the RO 200.

m. Example Operation of Information Processing Apparatus (RO)

FIGS. 16 and 17 are flowcharts of an exemplary communication process performed by an information processing apparatus (e.g., information processing apparatus 200), according to the first exemplary embodiment.

First, the control unit 210 judges whether a group addition request has been received (step S941) and when a group addition request has not been received, such monitoring is continued.

Meanwhile, if a group addition request has been received (step S941), the control unit 210 compares the received group addition request with the content of the group management database 220 (step S942). More specifically, the ID and password of the group included in the received group addition request and the ID and password of a group stored in the group management database 220 are compared and it is determined whether such IDs and passwords match (step S942). Next, if a group with a matching ID and password is not present (step S942), the control unit 210 transmits a notification showing that additional registration in the group relating to the group addition request is not possible to the wireless communication apparatus that transmitted the group addition request (step S943).

If a group with a matching ID and password is present (step S942), the control unit 210 updates the content of the group management database 220 (step S944). In such updating, the wireless communication apparatus that transmitted the group addition request is provisionally registered.

Next, the control unit 210 determines whether a DB confirmation request has been received (step S945) and if a DB confirmation request has not been received, the control unit 210 determines whether a certain period (for example, 24 hours) has elapsed since the provisional registration (step S946).

If a certain time has not elapse since the provisional registration (step S946), the processing returns to step S945). Meanwhile, if a certain time has elapsed from the provisional registration (step S946), the processing proceeds to step S954. That is, the control unit 210 updates the content of the group management database 220 (step S954). In such updating, the provisional registration is deleted.

Meanwhile, when a DB confirmation request has been received (step S945), the control unit 210 compares the received DB confirmation request with the content of the group management database 220 (step S947). More specifically, the group ID and password included in the received DB confirmation request are compared with the ID and password of each group stored in the group management database 220 and it is determined whether such IDs and passwords match (step S947). After this, if a group with a matching ID and password is not present (step S947), the control unit 210 transmits a notification showing that the group relating to the DB confirmation request is not present to the wireless communication apparatus that transmitted the DB confirmation request (step S948).

If a group with a matching ID and password is present (step S947), the control unit 210 determines whether the wireless communication apparatus that transmitted the DB confirmation request stores a valid MCIM (step S949). As one example, such determination is carried out based on the valid/invalid information 226 (shown in FIGS. 4(a) to 5(b)) of the group management database 220.

If the wireless communication apparatus that transmitted the DB confirmation request stores a valid MCIM (step S949), the control unit 210 transmits the DB confirmation information to the wireless communication apparatus via the SHO 150 (step S950). Meanwhile, if the wireless communication apparatus that transmitted the DB confirmation request does not store a valid MCIM (step S949), the control unit 210 transmits the DB confirmation information directly to the wireless communication apparatus without passing the SHO 150 (step S951).

Next, the control unit 210 determines whether approval information has been received (step S952), and if the approval information has not been received, the control unit 210 determines whether a certain period (for example, 24 hours) has elapsed since the provisional registration (step S953).

If a certain period has not elapsed since the provisional registration (step S953), the processing returns to step S952. Meanwhile, if a certain period has elapsed from the provisional registration (step S953), the control unit 210 updates the content of the group management database 220 (step S954). In such updating, the provisional registration is deleted.

Meanwhile, if the approval information has been received (step S952), the control unit 210 updates the content of the group management database 220 based on the received approval information (step S955). In such updating, the wireless communication apparatuses for which group addition requests have been received are fully registered.

2. Second Embodiment

In the first exemplary embodiment, content of the group management database 220 is acquired and an approval operation and a confirmation operation are carried out according to a manual operation by the user is described. Here, when a wireless communication apparatus that has made a group addition request is provisionally registered or fully registered, it is also possible to transmit a message showing such registration and/or the content of the group management database 220 to the respective wireless communication apparatuses composing the group. By doing so, it is believed that the user will be able to quickly grasp such registration and quickly carry out the various operations (an approval operation and a confirmation operation).

For this reason, in a second exemplary embodiment of the present disclosure, an example is described where whenever a wireless communication apparatus that has made a group addition request is provisionally registered or fully registered, a message showing such registration and/or the content of the group management database 220 is automatically transmitted to the respective wireless communication apparatuses. Note that the configuration of the communication system according to the second embodiment of the present disclosure is substantially the same as the example shown in drawings such as FIG. 3. For this reason, parts that are the same as in the first embodiment of the present disclosure have been assigned the same reference numerals and the description thereof is partially omitted.

a. Example of Communication when Carrying Out Additional Registration Using a Plurality of Wireless Communication Apparatuses FIGS. 18 and 19 are flowcharts of an exemplary communication process carried out performed by a communications system (e.g., communication system 100), according to the second exemplary embodiment. Note that since the sequence charts shown in FIGS. 18 and 19 are a modification to FIGS. 10 and 11, parts that are the same as FIGS. 10 and 11 have been assigned the same reference numerals and the description thereof is partially omitted.

After updating the content of the group management database 220 (provisional registration) (step 608), the control unit 210 of the RO 200 transmits information (DB confirmation information) relating to the group that has been updated to the respective wireless communication apparatuses belonging to such group (661 to 664). Note that although an example where the DB confirmation information is transmitted to only the first wireless communication apparatus 300 is shown for ease of explanation in FIG. 18, it is also possible to transmit the DB confirmation information to all or some of the wireless communication apparatuses that have been fully registered in the group that has been updated.

Note that the processes (steps 661 to 671) shown in FIGS. 18 and 19 correspond to the processes (steps 615 to 625) shown in FIGS. 10 and 11. However, the processing differs in that the information processing apparatus 200 automatically transmits the DB confirmation information in accordance with the updating of the group management database 220 (here, provisional registration).

After the content of the group management database 220 has been updated (full registration) (step 671), the control unit 210 transmits the information (approval state information) showing the result of the updating (full registration) to the wireless communication apparatus (the third wireless communication apparatus 410) that has been fully registered by the updating (steps 672 and 673). Note that although an example where the approval state information is transmitted to only the wireless communication apparatus (the third wireless communication apparatus 410) that has been fully registered by the updating is shown in FIG. 19, it is also possible to transmit the approval state information to some or all of the wireless communication apparatuses belonging to the group related to the updating.

Note that the processes (steps 672 to 674) shown in FIG. 19 correspond to the processes (steps 630 to 632) shown in FIGS. 10 and 11). However, the processing differs in that the information processing apparatus 200 automatically transmits the approval state information in accordance with the updating (full registration) of the group management database 220.

It is also possible to apply the second embodiment of the present disclosure to a case where group addition approval is given by the second wireless communication apparatus 400 that does not store a valid MCIM. However, in such case, the processing differs to the example shown in FIGS. 18 and 19 in that the exchanging of information between the second wireless communication apparatus 400 and the RO 200 is carried out directly between the RO 200 and the second wireless communication apparatus 400 without passing the SHO 150.

In this way, when a group addition request has been received, the control unit 210 of the RO 200 transmits an addition approval request (DB confirmation information) for carrying out an approval operation for such group addition request via a wireless connection to one or more wireless communication apparatuses that compose such group. If an addition approval result (approval information) showing that an approval operation has been carried out has been received from a wireless communication apparatus to which the addition approval request was transmitted, the control unit 210 of the RO 200 carries out a registration process that additionally registers (fully registers) the wireless communication apparatus that transmitted the group addition request in the group.

Also, if a wireless communication apparatus that transmitted a group addition request has been provisionally registered in a group, the control unit 210 of the RO 200 transmits notification showing such provisional registration and an addition approval request (DB confirmation information) via a wireless connection to one or more of the wireless communication apparatuses that compose such group.

b. Example Operation of Wireless Communication Apparatus

FIG. 20 is a flowchart of an exemplary communication process performed by a wireless communications apparatus (e.g., the third wireless communication apparatus 410), according to the second exemplary embodiment. Since this processing procedure is a modification to FIG. 14, parts that are the same as in FIG. 14 have been assigned the same reference numerals and the description thereof has been partially omitted.

After a group addition request has been transmitted to the RO 200 corresponding to a transmission operation (addition operation) for a group addition request (step S905), the control unit 330 determines whether approval state information has been received (step S911), and subsequently generates an instruction to display a confirmation state information screen through a display unit of wireless communications apparatus.

FIG. 21 is a flowchart of an exemplary communication process performed by a wireless communications apparatus (e.g., the first wireless communication apparatus 300), according to the second exemplary embodiment. Since this processing procedure is a modification to FIG. 15, parts that are the same as in FIG. 15 have been assigned the same reference numerals and description thereof is partially omitted.

First, the control unit 330 determines whether DB confirmation information relating to the group to which the first wireless communication apparatus 300 belongs has been received (step S926) and if DB confirmation information has not been received, such monitoring is continued.

If first wireless communication apparatus 300 is received the DB conformation information, a display confirmation operation screen (e.g., approval operation screen 510 of FIG. 8) may be displayed using a display unit of first wireless communication apparatus 300.

Also, when a pressing operation of a return button (for example, a pressing operation of the return button 515 of approval operation screen 510 shown in FIG. 8) has been carried out (step S928), the processing returns to step S926.

If the pressing operation has not been performed, control unit 330 determines whether a transmission operation for approval information has been initiated in step S929. If such a transmission operation has been initiated, the control unit generates an instruction to transmit approval information, e.g., to SHO 200. If such a transmission operation has not been issued, the exemplary method passes back to step S928.

c. Example Operation of Information Processing Apparatus (RO)

FIGS. 22 and 23 are flowcharts of an exemplary communication process performed by an information processing apparatus (e.g., information processing apparatus 200), according to the second exemplary embodiment. Since this processing procedure is a modification to FIGS. 16 and 17, parts that are the same as in FIGS. 16 and 17 have been assigned the same reference numerals and the description thereof is partially omitted.

After updating the content of the group management database 220 (provisional registration) (step S944), the control unit 210 extracts the wireless communication apparatuses that belong to the group related to the updating (step S961). In this case, all or some of the wireless communication apparatuses that have been fully registered in the group related to the updating are extracted. As one example, at least the number of wireless communication apparatuses required for an approval operation are extracted.

Next, the control unit 210 determines whether an extracted wireless communication apparatus stores a valid MCIM (step S962). Note that when a plurality of wireless communication apparatuses are extracted, it is determined whether the individual wireless communication apparatuses store a valid MCIM.

After updating the content of the group management database 220 (full registration) (step S955), the control unit 210 transmits information (approval state information) showing the result of the updating (full registration) to the wireless communication apparatus that has been fully registered by such updating (step S963).

Note that the control unit 210 may confirm the content of the group management database 220 on a regular or irregular basis and carry out the processes described above (steps S961 to S963) for a group including one or more wireless communication apparatuses for which the approval state 227 is "unapproved".

In this way, according to the second embodiment of the present disclosure, when a wireless communication apparatus that has made a group addition request has been provisionally registered or fully registered, it is possible to automatically transmit a message showing such updating and/or the content of the group management database 220 to the wireless communication apparatuses. By doing so, it is possible for the user to quickly grasp the updating and to quickly carry out various operations (an approval operation and a confirmation operation).

3. Modifications

In the first and second exemplary embodiments, examples are described where a group addition operation is carried out using wireless communication apparatuses equipped with display units. Here, when carrying out additional registration in a group on a wireless communication apparatus equipped with a user interface (display unit) with comparatively high display performance, it is possible to display the respective display screens on such display unit and to carry out the addition operation for the group using such display screens. However, a case can also be imagined where additional registration in a group is carried out using a wireless communication apparatus equipped with only a user interface of limited display performance and it is not possible to display the respective display screens. For this reason, as a modification, an example is described where an addition operation for a group is carried out using a wireless communication apparatus equipped with only a user interface of limited display performance.

a. Example of a Wireless Communication Apparatus Equipped with a User Interface Aside from a Display Unit FIGS. 24(*a*) and 24(*b*) are perspective views showing an exemplary speaker apparatus (e.g., speaker apparatus 800), according to an exemplary embodiment of the present disclosure. That is, in FIG. 24, the speaker apparatus 800 is shown as one example of a wireless communication apparatus equipped with only a user interface of limited display performance. Also, in FIG. 24, in the speaker apparatus 800 equipped with only a user interface of limited display performance, one example of operation elements used when carrying out an addition operation for a group (i.e., a light emitting unit 810 and an operation unit 820) are shown.

FIG. 24(*a*) is a perspective view from the front side of the speaker apparatus 800 and FIG. 24(*b*) is a perspective view from the rear side of the speaker apparatus 800. Also, the speaker apparatus 800 includes the light emitting unit 810 and the operation unit 820. The internal configuration relating to communication in the speaker apparatus 800 is assumed to be substantially the same as in the first wireless communication apparatus 300 shown in FIG. 6. As one example, the light emitting unit 810 corresponds to the display unit 370, the operation unit 820 corresponds to the operation unit 360.

The light emitting unit 810 is a light emitting unit provided on an exterior surface of the speaker apparatus 800 and is constructed of a LED, for example. The light emitting unit 810 is lit up and extinguished based on a control signal from the control unit 330.

The operation unit 820 is constructed of one or a plurality of operation elements provided on the exterior surface of the speaker apparatus 800.

For example, as described in the second embodiment of the present disclosure, a case is imagined where the speaker apparatus 800 receives the DB confirm information (step 664 shown in FIG. 18). In this case, by having the light emitting unit 810 carry out a specified flashing operation (for example, flashing five times with a fixed interval), it is possible to notify the user of the authentication result (step 665 shown in FIG. 19). As another example, it is also possible to use a plurality of LEDs as the light emitting unit 810 and to notify the user that a DB confirm information has been received by way of a lighting pattern that uses a combination of such LEDs.

After this, if an indication showing that the DB confirmation information has been received has been given using the light emitting unit 810, by carrying out a specified operation of the operation elements (for example pressing a confirm button five times consecutively) within a specified period, the user can carry out an approval operation. Note that when an indication showing that the DB confirmation information has been received has been given using the light emitting unit 810, if the specified operation of the operation elements has not been made within the specified period, it is determined that an approval operation has not been carried out.

As one example, as shown in the first embodiment of the present disclosure, the user may carry out a DB confirm operation (609 shown in FIG. 10) by carrying out a specified operation of the operation elements (for example, carrying out two simultaneous pressing operations of the confirm button and an arrow button). In this case, as one example, a contactless communication unit may be provided on the communication system 800 and the various information (for example, a group ID and password) to be used in a DB confirmation operation made using the contactless communication unit may be acquired before use from another wireless communication apparatus.

In this way, according to the modification of the embodiments of the present disclosure, it is possible for a device with a simple UI (user interface) to carry out each operation related to the group registration. This means that it is possible to carry out each operation related to the group registration using various types of wireless communication apparatus.

Note that in the embodiments of the present disclosure, examples where the information processing apparatus 200 is constructed of a single device have been described. However, it is also possible to apply the embodiments of the present disclosure to an information processing system where the various components of the information processing apparatuses (for example, the control unit 210 and the group management database 220) are configured using a plurality of apparatuses. Also, although examples where the group AB is composed of two or three wireless communication apparatuses have been described in the embodiments of the present disclosure, it is also possible to apply the embodiments of the present disclosure to a group composed of four or more wireless communication apparatuses. It is also possible to apply the embodiments of the present disclosure to mobile wireless communication apparatuses (for example a dedicated data communication terminal apparatus) or fixed-type wireless communication apparatuses (for example, a wireless communication apparatus for data collection at a vending machine).

Examples where use rights over an MCIM are used as network connection rights are described above in the embodiments of the present disclosure. However, it is also possible to apply the embodiments of the present disclosure to other network connection rights for connecting to a specified network based on other information (for example, a Universal Subscriber Identity Module (USIM)).

Note that the embodiments given above describe examples used to embody the present disclosure and that elements in the embodiments correspond to elements in the patent claims. In the same way, elements in the patent claims correspond to elements in the embodiments of the present disclosure that have been given the same names. However, it should be understood by those skilled in the art that various modifications, combinations, sub-combinations and alterations may occur depending on design requirements and other factors insofar as they are within the scope of the appended claims or the equivalents thereof.

The processing procedures described in the embodiments given above may take the form of a method including a series of such procedures and may also take the form of a set of instructions or a program for causing a computer to execute a series of such procedures, or one or more tangible, non-transitory computer-readable media storing such instructions or program. Additionally or alternatively, computer programs and sets of instructions may also be received via a communications interface and stored on the one or more computer-readable media. Examples of such computer-readable media include, but are not limited to, random access memory (RAM), read-only memory (ROM), and various tangible, non-transitory computer-readable media such as hard disks, flash memory, compact discs (CDs), minidisks (MDs), a DVD (Digital Versatile Disc), a memory card, a Blu-ray Disc (registered trademark) or the like.

Such computer programs and instructions, when executed by at at least one processor of a disclosed information processing apparatus (e.g., the SHO, the RO, or one or more of the wireless communications apparatuses) enable the at least one processor to perform the computer-implemented methods described herein. Examples of program instructions include, for example, machine code, such as code produced by a compiler, and files containing a high-level code that can be executed by the processor using an interpreter.

Additionally, the present technology may also be configured as below.

(1)

An information processing apparatus, comprising:

a receiving unit configured to receive, from a first communications device, a request to join a group of second communications devices, the second communications devices being associated with at least one shared connection right; and a control unit configured to provisionally transfer the shared connection right to the first communications device, in response to the received request.

(2)

The apparatus of (1), wherein the group is associated with a plurality of shared connection rights.

(3)

The apparatus of (1) or (2), wherein the at least one shared connection right is established based on information associated with a machine communication identity module.

(4)

The apparatus of any one of (1) to (3), wherein:

the information processing apparatus corresponds to a registration operator associated with a communications provider; and the information processing apparatus is configured to establish, through a base station, communications with the first communications device using a corresponding provisional connectivity identity.

(5)

The apparatus of any one of (1) to (4), wherein:

the request comprises first information associated with the group; and the control unit is further configured to authenticate the request based on at least the first group information.

(6)

The apparatus of (5), wherein the group information comprises at least one of an identifier of the group or a password associated with the group identifier.

(7)

The apparatus of (6), wherein the control unit is further configured to:

obtain second information associated with the group from a database;

determine whether the at least a portion of the first group information matches a corresponding portion of the second group information; and authenticate the request when the first group information portion matches the second group information portion.

(8)

The apparatus of (7), wherein the control unit is further configured to generate an instruction to transmit, to the first communications device, information indicative of a failed authentication, when the first group information portion fails to match the second group information portion.

(9)

The apparatus of any one of (5) to (8), wherein the control unit is further configured to provisionally transfer the shared connection right to the first communications device upon authentication of the request.

(10)

The apparatus of (9), wherein:

the request further comprises information identifying the first communications device; and the control unit is further configured to:

identify second information associated with the group within a database; and generate an instruction to update the second information to include the first communications device information.

(11)

The apparatus of (10), wherein:

the first communications device information comprises a provisional connectivity identity of the first communications device; and the second group information comprises provisional connectivity identities associated with the second communications devices.

(12)

The apparatus of any one of (1) to (11), wherein the receiving unit is further configured to receive, from at least one of the second communications devices, information approving the provisional transfer.

(13)

The apparatus of (12), wherein the control unit is further configured to establish the shared connection right between the first and second communications devices, in accordance with the approval information.

(14)

The apparatus of (13), wherein the control unit is further configured to:

identify, within a database, information indicative of a status of the transfer of the shared connection right; and generate an instruction to update the status information within the database, in accordance with the approval information.

(15)

The apparatus of (13) or (14), wherein the control unit is further configured to generate an instruction to transmit a confirmation of the approved transfer to the first communications device.

(16)
The apparatus of (15), further comprising a transmission unit configured to transmit the confirmation to the first communications device, in accordance with the generated instruction.

(17)
The apparatus of (15) or (16), wherein the confirmation comprises at least one of information identifying the shared connection right or information identifying the second communications device associated with the approval information.

(18)
A computer-implemented method, comprising:
receiving, from a first communications device, a request to join a group of second communications devices, the second communications devices being associated with at least one shared connection right; and
generating, using a processor, an instruction to provisionally transfer the shared connection right to the first communications device, in response to the received request.

(19)
A tangible, non-transitory computer-readable medium storing instruction that, when executed by at least one processor, cause the at least one processor to perform a method, comprising:
receiving, from a first communications device, a request to join a group of second communications devices, the second communications devices being associated with at least one shared connection right; and
generating an instruction to provisionally transfer the shared connection right to the first communications device, in response to the received request.

(20)
A communications device, comprising a control unit configured to:
generate an instruction to transmit, to an information processing apparatus, a request to join a group of additional communications devices, the additional communications devices being associated with at least one shared connection right; and
establish the shared connection right with the group of additional communications devices, in response to approval information provided by at least one of the additional communications devices.

(21)
A computer-implemented method, comprising:
generating an instruction to transmit, to an information processing apparatus, a request to join a group of additional communications devices, the additional communications devices being associated with at least one shared connection right; and
establishing, using a processor, the shared connection right with the group of additional communications devices, in response to approval information provided by at least one of the additional communications devices.

(22)
A tangible, non-transitory computer-readable medium storing instruction that, when executed by at least one processor, cause the at least one processor to perform a method, comprising:
generating an instruction to transmit, to an information processing apparatus, a request to join a group of additional communications devices, the additional communications devices being associated with at least one shared connection right; and
establishing the shared connection right with the group of additional communications devices, in response to approval information provided by at least one of the additional communications devices.

(23)
A communications system, comprising:
a first communications device configured to generate an instruction to transmit a request to join a group of second communications devices associated with at least one shared connection right; and
an information processing apparatus, comprising: a receiving unit configured to receive the request to join the group from the first communications device; and
a control unit configured to provisionally transfer the shared connection right to the first communications device, in response to approval information provided by at least one of the additional communications devices.

REFERENCE SIGNS LIST

100 Communication system
110 Public network
120 Network control apparatus
121, 122, 206 Base station
123-126, 207 Wireless connection
200 Information processing apparatus
205 Communication unit
207 Wireless connection
210, 330 Control unit
220 Group management database
300 First wireless communication apparatus
311 Antenna
312 Antenna sharing unit
321 Modulating unit
322 Demodulating unit
331 Bus
340 Memory
350 MCIM information storage unit
360 Operation unit
370 Display unit
380 Location information acquiring unit
391 Microphone
392 Speaker
400 Second wireless communication apparatus
410 Third wireless communication apparatus
800 Speaker apparatus
810 Light emitting unit
820 Operation unit

The invention claimed is:
1. An information processing apparatus, comprising:
at least one processor configured to:
receive, from a first communication device, a request to join a group of second communication devices,
wherein the group of second communication devices is associated with a plurality of shared connection rights that enables each of the group of second communication devices to access a network, and
wherein a shared connection right of the plurality of shared connection rights includes a machine communication identity module (MCIM) to access the network, wherein the MCIM is individually set in each second communication device of the group of second communication devices;
provisionally transfer at least one shared connection right of the plurality of shared connection rights to the first communication device based on the request and based on an approval state associated with a second communication device of the group of second communication devices, wherein the approval state indicates that the second communication device is permitted to approve the provisional transfer of the at least one shared connection right, and wherein the second communication device that is permitted to approve the provisional transfer of the at least one shared connection right is different from the information processing apparatus; and invalidate the MCIM set in the second communication device and set the MCIM in the first communication device, based on the provisional transfer.

2. The information processing apparatus of claim 1, wherein the at least one processor is further configured to establish the at least one shared connection right based on information associated with the MCIM.

3. The information processing apparatus of claim 1, wherein
the information processing apparatus corresponds to a registration operator associated with a communication provider; and
the information processing apparatus is further configured to establish, via a base station, communication with the first communication device based on a provisional connectivity identity of the first communication device.

4. The information processing apparatus of claim 1, wherein
the request comprises first information associated with the group of second communication devices; and
the at least one processor is further configured to authenticate the request based on the first information.

5. The information processing apparatus of claim 4, wherein the first information comprises at least one of an identifier of the group of second communication devices or a password associated with the identifier.

6. The information processing apparatus of claim 5, wherein the at least one processor is further configured to:
obtain second information associated with the group of second communication devices from a database;
determine that a portion of the first information matches a corresponding portion of the second information; and
authenticate the request based on the determination that the portion of the first information matches the corresponding portion of the second information.

7. The information processing apparatus of claim 6, wherein the at least one processor is further configured to:
determine that the portion of the first information fails to match the corresponding portion of the second information;
generate an instruction indicative of a failed authentication, based on the determination that the portion of the first information fails to match the corresponding portion of the second information; and
cause transmission of third information indicative of the failed authentication to the first communication device, based on the instruction.

8. The information processing apparatus of claim 4, wherein the at least one processor is further configured to provisionally transfer the at least one shared connection right to the first communication device based on the authentication of the request.

9. The information processing apparatus of claim 8, wherein
the request further comprises second information that identifies the first communication device; and the at least one processor is further configured to:
identify, within a database, third information associated with the group of second communication devices;
generate an instruction to update the third information to include the second information; and
update the third information such that the third information includes the second information, based on the instruction.

10. The information processing apparatus of claim 9, wherein
the second information comprises a provisional connectivity identity of the first communication device; and
the third information comprises provisional connectivity identities associated with the group of second communication devices.

11. The information processing apparatus of claim 1, wherein the at least one processor is further configured to:
receive, from the second communication device, approval information to approve the provisional transfer; and
approve the provisional transfer based on the approval information.

12. The information processing apparatus of claim 11, wherein the at least one processor is further configured to establish the at least one shared connection right between the first communication device and the group of second communication devices based on the approval information.

13. The information processing apparatus of claim 12, wherein the at least one processor is further configured to:
identify, within a database, status information indicative of a status of the provisional transfer of the at least one shared connection right;
generate an instruction, based on the approval information, to update the status information within the database; and
update the status information within the database based on the instruction.

14. The information processing apparatus of claim 12, wherein the at least one processor is further configured to:
generate an instruction to transmit a confirmation of the approved provisional transfer to the first communication device; and
cause transmission of the confirmation to the first communication device based on the instruction.

15. The information processing apparatus of claim 14, wherein the confirmation comprises one of first information that identifies the at least one shared connection right, or second information that identifies the second communication device associated with the approval information.

16. A method, comprising:
in an information processing apparatus:
receiving, from a first communication device, a request to join a group of second communication devices,
wherein the group of second communication devices is associated with a plurality of shared connection rights that enables each of the group of second communication devices to access a network,
wherein a shared connection right of the plurality of shared connection rights includes a machine communication identity module (MCIM) to access the network, wherein the MCIM is individually set in each second communication device of the group of second communication devices;
generating, based on the request, an instruction to provisionally transfer at least one shared connection right of the plurality of shared connection rights to the first communication device,
wherein the provisional transfer of the at least one shared connection right is based on an approval state associated with a second communication device of the group of second communication devices, wherein the approval state indicates that the second communication device is permitted to approve the provisional transfer of the at least one shared connection right, and wherein the second communication device that is permitted to approve the provisional transfer of the at least one shared connection right is different from the information processing apparatus; and invalidating the MCIM set in the second communication device and setting the MCIM in the first communication device, based on the provisional transfer.

17. A first communication device, comprising:

at least one processor configured to:

generate an instruction to transmit, to an information processing apparatus, a request to join a group of second communication devices, wherein the group of second communication devices is associated with a plurality of shared connection rights that enables each of the group of second communication devices to access a network, and wherein a shared connection right of the plurality of shared connection rights includes a machine communication identity module (MCIM) to access the network, wherein the MCIM is individually set in each second communication device of the group of second communication devices; and establish at least one shared connection right of the plurality of shared connection rights with the group of second communication devices based on approval information from a second communication device of the group of second communication devices, wherein the information processing apparatus is configured to provisionally transfer the at least one shared connection right to the first communication device, wherein the provisional transfer of the at least one shared connection right is based on an approval state associated with the second communication device, wherein the approval state indicates that the second communication device is permitted to approve the provisional transfer of the at least one shared connection right, wherein the second communication device that is permitted to approve the provisional transfer of the at least one shared connection right is different from the information processing apparatus, and wherein the information processing apparatus is further configured to invalidate the MCIM set in the second communication device and set the MCIM in the first communication device, based on the provisional transfer.

18. A communication system, comprising:

a first communication device configured to:

generate an instruction to transmit a request to join a group of second communication devices associated with a plurality of shared connection right; and transmit the request based on the instruction, wherein the plurality of shared connection rights enables each of the group of second communication devices to access a network, wherein a shared connection right of the plurality of shared connection rights includes a right over a machine communication identity module (MCIM) to access the network, wherein the MCIM is individually set in each second communication device of the group of second communication devices; and an information processing apparatus, comprising:

at least one processor configured to:

receive the request to join the group of second communication devices from the first communication device;

provisionally transfer at least one shared connection right of the plurality of shared connection rights to the first communication device based on approval information from a second communication device of the group of second communication devices, and based on an approval state associated with the second communication device, wherein the approval state indicates that the second communication device is permitted to approve the provisional transfer of the at least one shared connection right, and wherein the second communication device that is permitted to approve the provisional transfer of the at least one shared connection right is different from the information processing apparatus; and invalidate the MCIM set in the second communication device and set the MCIM in the first communication device, based on the provisional transfer.

19. The information processing apparatus of claim 1, wherein the at least one processor is further configured to receive, from a first plurality of second communication devices of the group of second communication devices, information to approve the provisional transfer.

20. The information processing apparatus of claim 1, wherein the at least one processor is further configured to receive within a threshold time, information from the group of second communication devices to approve the provisional transfer.

* * * * *